(12) United States Patent
Zhang

(10) Patent No.: US 12,504,968 B2
(45) Date of Patent: Dec. 23, 2025

(54) SOFTWARE UPDATE OF EDGE DEVICES OVER ONE-WAY ETHERNET

(71) Applicant: GM Cruise Holdings LLC, San Francisco, CA (US)

(72) Inventor: Tianrui Zhang, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 198 days.

(21) Appl. No.: 18/343,495

(22) Filed: Jun. 28, 2023

(65) Prior Publication Data

US 2025/0004746 A1 Jan. 2, 2025

(51) Int. Cl.
*G06F 8/65* (2018.01)
*G06F 8/71* (2018.01)
*G06F 21/57* (2013.01)
*H04L 69/164* (2022.01)

(52) U.S. Cl.
CPC ............... *G06F 8/65* (2013.01); *G06F 8/71* (2013.01); *G06F 21/57* (2013.01); *H04L 69/164* (2013.01)

(58) Field of Classification Search
CPC ... G06F 8/65; G06F 8/71; G06F 21/57; H04L 69/164; H04L 67/12
See application file for complete search history.

(56) References Cited

U.S. PATENT DOCUMENTS

| | | | |
|---|---|---|---|
| 2011/0143661 A1* | 6/2011 | Hartwig | G06F 8/65 455/41.1 |
| 2014/0376405 A1* | 12/2014 | Erickson | H04W 76/14 370/254 |
| 2017/0347133 A1* | 11/2017 | Wang | H04N 21/2381 |
| 2019/0007379 A1* | 1/2019 | Larsen | H04L 63/0209 |
| 2019/0014081 A1* | 1/2019 | Kim | H04L 63/101 |
| 2020/0106486 A1* | 4/2020 | Nammi | H04B 7/0673 |
| 2021/0314423 A1* | 10/2021 | Rolando | H04L 63/164 |
| 2024/0419429 A1* | 12/2024 | Mesde | G06F 8/65 |

FOREIGN PATENT DOCUMENTS

| | | | | |
|---|---|---|---|---|
| CN | 115552844 A | * | 12/2022 | G06F 21/606 |
| CN | 116074308 A | * | 5/2023 | |
| JP | 2008172788 A | * | 7/2008 | H04L 12/66 |

* cited by examiner

*Primary Examiner* — Daxin Wu
(74) *Attorney, Agent, or Firm* — CANTOR COLBURN LLP

(57) ABSTRACT

For security reasons, a one-way Ethernet communication link is implemented to segregate edge devices for an autonomous vehicle (AV) from the AV compute system. A non-feature rich backchannel allows very limited amounts of data to be transmitted from the edge devices side to the AV compute side. It is a challenge to query information about the edge devices when the backchannel only allows enumerated type data values to be transmitted. To address this concern, the customer-facing access point includes a relay endpoint that operates as a proxy to a web server that manages the edge devices and encodes responses as enumerated type data values to be transmitted over the backchannel.

10 Claims, 12 Drawing Sheets

SOFTWARE UPDATE OF EDGE DEVICES OVER ONE-WAY ETHERNET

BACKGROUND

Technical Field

The present disclosure relates to autonomous vehicles and, more specifically, to updating software of edge devices in autonomous vehicles.

Introduction

Autonomous vehicles (AVs), also known as self-driving cars, and driverless vehicles, may be vehicles that use multiple sensors to sense the environment and move without human input. Automation technology in AVs may enable vehicles to drive on roadways and to perceive the vehicle's environment accurately and quickly, including obstacles, signs, and traffic lights.

Autonomous technology may utilize geographical information and semantic objects (such as parking spots, lane boundaries, intersections, crosswalks, stop signs, traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples.

Furthermore, the skilled artisan will appreciate the principles of the present technology as described and explained with additional specificity and detail through the use of the accompanying drawings.

DETAILED DESCRIPTION

Figure 1:
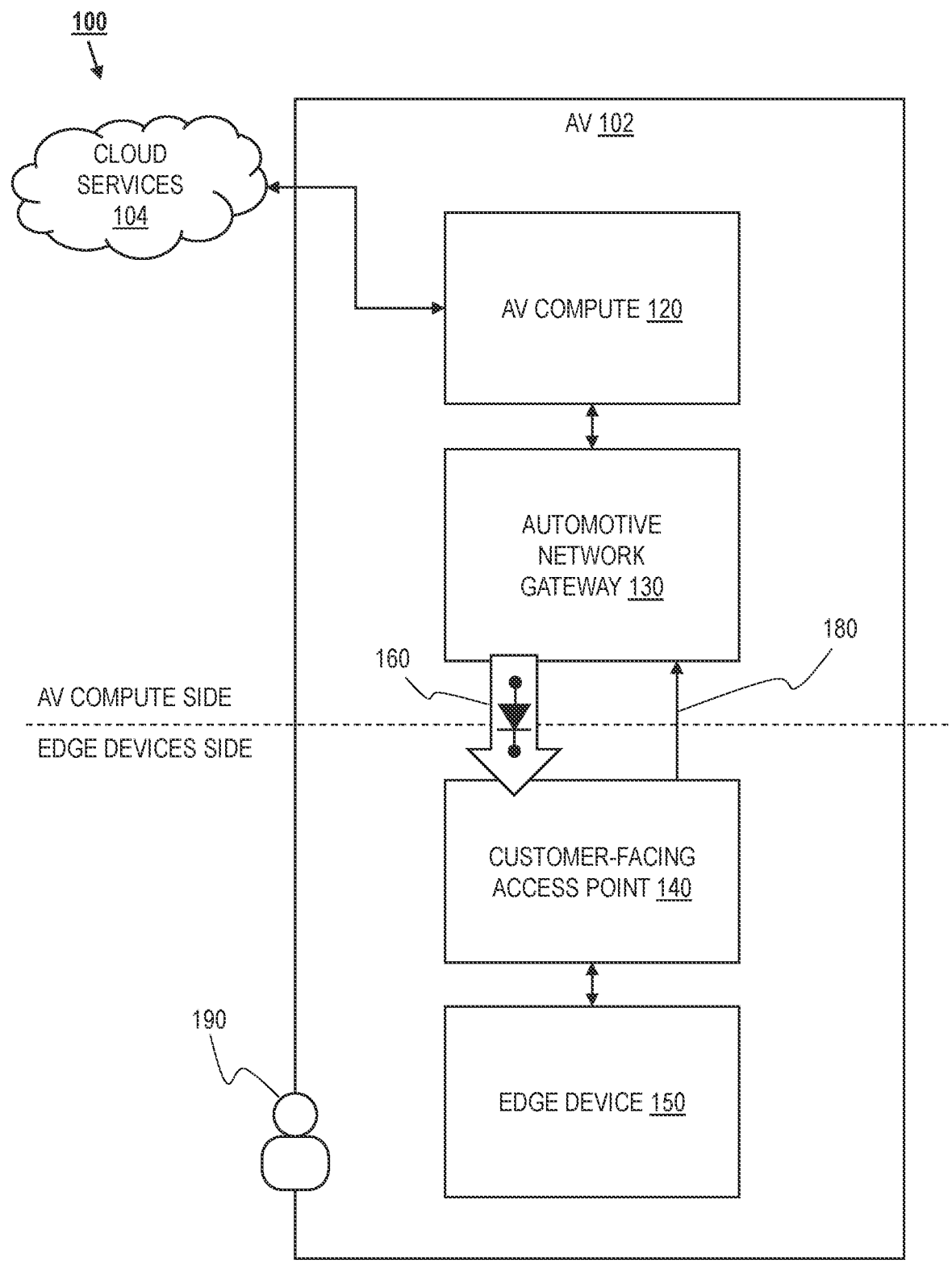
FIG. 1 illustrates potential cybersecurity security risks in an AV and implementation of a one-way Ethernet network connection and a backchannel, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering opportunities for efficient, accessible, and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

The operations of perception, prediction, planning, and control at an AV may be implemented using a combination of hardware and software components, together forming an AV compute system (sometimes referred to as AV compute). For instance, an AV stack or AV compute process performing the perception, prediction, planning, and control may be implemented as software code or firmware code. The AV stack or AV compute process (the software and/or firmware code) may be executed on the AV compute system on the AV, including one or more processor(s) (e.g., general processors, central processors (CPUs), graphical processors (GPUs), digital signal processors (DSPs), ASIC, etc.) and/or any other hardware processing components. Additionally, the AV stack or AV compute process may communicate with various hardware components (e.g., on-board sensors and control system of the AV) and/or with an AV infrastructure over a network.

AVs can be particularly useful as rideshare, ridehail, or delivery vehicles to offer efficient and enjoyable transportation. Passengers of these AVs may interact with user (computing) devices. For instance, a passenger may use a user-facing device provided by an AV, such as a tablet. The tablet may allow the passenger to control a radio or cabin temperature. In another instance, a passenger may bring a user (computing) device and connect the device to a wireless hotspot provided by the AV, a wireless connection to play audio from the user (computing) device or plug in a power cable to an outlet in the AV to charge the device. These user devices are conveniently used to provide information and entertainment to the passengers while riding in the AV.

These user devices may be considered edge devices of an AV fleet management system, e.g., at the customer-facing edge of the AV fleet management system. The edge devices may be communicably connected to a customer-facing access point in the AV. Malicious users (or hackers) can take advantage of edge devices to gain unauthorized access to AV subsystems (e.g., AV compute system, AV sensors, AV controls system, and AV cabin system). For security reasons, a one-way Ethernet communication link is implemented to segregate edge devices from the AV subsystems, including the AV compute system. In other words, the one-way Ethernet communication link allows information-rich data traffic from the AV compute side to the edge devices side but disallows data traffic from the edge devices side to the AV compute side. The one-way Ethernet network connection (or communication link) can physically ensure that the edge devices may only receive content from the AV compute side, and that the edge devices side may not send data to the AV compute side on the one-way connection. A non-feature rich backchannel may allow very limited bits of data to be transmitted from the edge devices side to the AV compute side.

At launch time of an AV (e.g., when the AV boots up or turns on), the AV compute may execute a launch process to ensure that expected edge devices are present and the version of software running on the edge devices are as expected. If the software version is not as expected, the AV compute may send a software package and trigger an installation of the software package. It is a challenge to manage edge devices (e.g., query information about the edge devices or receive information-rich messages from the edge devices side), when the information-rich communication link is only one-way from the AV compute side to the edge devices side, and the backchannel from the edge devices side back to the AV compute side only allows enumerated type data values to be transmitted. In other words, it is not possible for the AV compute to transmit reliable Transport Control Protocol (TCP) packets to the edge devices side, and it is not possible for the AV compute to receive information-rich messages that includes, e.g., a version string, a string message, a list or array, a blob, text, etc., from the edge devices side to the AV compute side.

To address this technical challenge, an automotive network gateway on the AV compute side can include a web server that can transmit requests and other information to the edge devices side using the User Datagram Protocol (UDP) over the one-way Ethernet network connection. On the edge devices side, a customer-facing access point includes a relay endpoint that operates as a proxy to a web server on the customer-facing access point that manages the edge devices. The relay endpoint can receive and process requests and information transmitted from the AV compute side on the one-way Ethernet network connection, and coordinates the requests and information with the web server on the customer-facing access point. The relay endpoint can receive and process responses from the web server on the customer-facing access point. The relay endpoint can encode the responses into enumerated type data values and directs enumerated type data values the responses to be transmitted back to the AV compute side via the backchannel. The customer-facing access point can include a backchannel mailbox manager to package the responses having as enumerated type data values as data frames or packets that can be to be transmitted over the backchannel. The automotive network gateway can include a backchannel mailbox manager to unpack the data frames received over the backchannel to obtain the enumerated type data values, which can decode the enumerated type data values back into message responses that can be transmitted back to the web server on the automotive network gateway. The webserver on the automotive network gateway can then decode the enumerated type data values into message responses.

Figure 11:
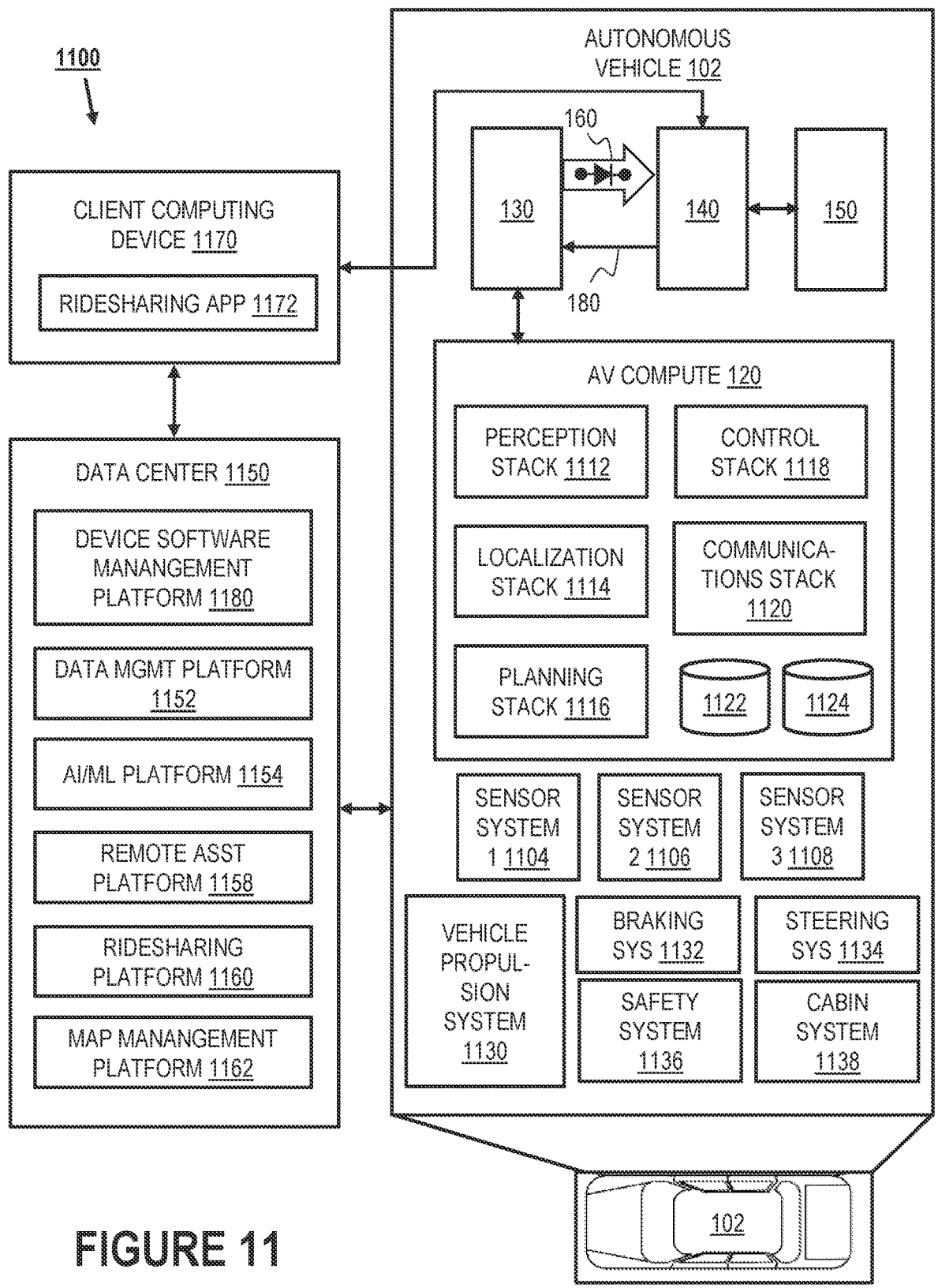
FIG. 11 illustrates an exemplary system environment that may be used to facilitate AV fleet operations, according to some aspects of the disclosed technology.

Implementation of a One-Way Ethernet Network Connection and a Limited Backchannel FIG. 1 illustrates potential cybersecurity security risks in AV 102 and implementation of a one-way Ethernet network connection 160 and a backchannel 180, according to some aspects of the disclosed technology. Diagram 100 illustrates a networked environment that has an AV, which may include AV compute 120 and edge device 150. AV compute 120 may be communicably connected to one or more cloud services 104 (e.g., platforms implemented on data center 1150 as illustrated in FIG. 11). AV 102 may have one or more customers or users, such as passenger 190.

AV compute side may include AV compute 120. AV compute 120 may include hardware and software components for performing perception, prediction, planning, and control of an AV. Besides AV compute 120, the AV 102, specifically, the AV compute side, may include other sensitive AV subsystems such as AV sensors, AV controls system, and AV cabin system, etc. AV sensors may include one or more cameras, one or more microphones, one or more Light Detection and Ranging (LIDAR) sensors, one or more Radio Detection and Ranging (RADAR) sensors, one or more pressure sensors, one or more time-of-flight sensors, one or more collision sensors, one or more temperature sensors, one or more weight sensors, one or more tire pressure sensors, etc. AV sensors 14 can generate sensor data, which can be used by AV compute 120 for operating the AV. AV controls system may include vehicle propulsion system, steering system, safety system, sensor wipers, windshield wipers, etc. AV cabin system may include windows, doors, locks, heating, air conditioning, AM/FM/satellite radio system, multi-media player, cabin monitoring system, one or more occupancy sensors, etc.

Edge devices side may include one or more edge devices, such as edge device 150. Edge device 150 may be a user device, e.g., user device that passenger 190 may interact with. Examples of user devices may include: a tablet or touch-sensitive display built into the cabin of the AV, touch-sensitive display devices, computing devices with user interfaces, bring your own user devices (e.g., wearables, laptops, mobile phones, tablets, virtual/augmented reality headsets).

Cloud services 104 may implement ridesharing (or ridehailing) platforms. Cloud services 104 may implement fleet management services to manage a fleet of AVs. Cloud services 104 may implement a platform to manage software that is running on the edge devices.

AV compute 120 and cloud services 104 may not be customer-facing. The AV compute side may be considered the more trusted side from a network security perspective. Edge device 150 is customer-facing, and the edge devices side may be considered the less trusted side from a network security perspective.

To facilitate communication between the AV compute side and edge devices side, AV 102 may include network communication devices, such as an automotive network gateway 130 and a customer-facing access point 140. Automotive network gateway 130 and customer-facing access point 140 may serve as the interface between the AV compute side and the edge devices side of the networked environment. Components on the AV compute side can communicate with the edge devices side through the automotive network gateway 130. Components on the edge devices side can communicate with the AV compute side through the customer-facing access point 140.

To segregate the edge devices side from the AV compute side, a one-way Ethernet network connection 160 is implemented between automotive network gateway 130 and customer-facing access point 140. The one-way Ethernet network connection 160 may include a hardware-based one-way data diode to ensure that data traffic only flows from the automotive network gateway 130 to the customer-facing access point 140. The one-way data diode can ensure that data traffic is not permitted to travel from the customer-facing access point 140 to the automotive network gateway 130. Data traffic from customer-facing access point 140 to the automotive network gateway 130 may be disallowed on the one-way Ethernet network connection 160. The one-way data diode can provide physical network security, since data traffic is prevented, by physical hardware-implemented measures, to be transmitted from edge devices side and AV compute side through the one-way data diode. In some embodiments, the one-way data diode does not involve software-based firewalls.

The one-way Ethernet network connection 160 advantageously can allow content to be sent from AV compute side to the edge devices side, e.g., to offer information, interaction, and/or entertainment to passenger(s) in the AV (such as passenger 190). Content can include blobs or files. Content can include data streams from AV sensors (e.g., camera feed from camera(s) mounted on the AV), trip information from AV compute 120 (and/or cloud services 104), driving maneuver information from the AV compute 120, state information of AV cabin system, data streams from other AVs managed by cloud services 104, infotainment content from AV cabin system (e.g., radio audio streams), infotainment content from cloud services 104, and string messages to passenger 190. Examples of string messages can include, "Is the trip going well?", "Buckle your seatbelt.", "Are you ready to go?", "Don't forget your items in the cabin.", "Left-turn approaching", "Red light ahead.", "We are stopped to let someone cross an intersection.", "We are waiting for our turn to drive through the 4-way stop.", "We are waiting for another rider to join us." etc.

The one-way Ethernet network connection 160 is limited in that the data cannot be transmitted using a protocol, such as TCP, that requires acknowledgements to be transmitted back to the sender. To address this limitation, the automotive network gateway 130 can be implemented to transmit information using UDP packets. In some cases, the packet definition of the UDP packets may be enhanced using a language-neutral, platform-neural extensible data format (e.g., Protocol Buffer). The enhancement can benefit systems that may be implemented using different programming languages (e.g., components in automotive network gateway 130 may be implemented using one programming language, and components in the customer-facing access point 140 may be implemented in a different programming language). As an additional benefit, transmitting UDP packets may be significantly faster than using TCP, and may be processed in parallel on the edge devices side.

In some cases, the edge device side may wish to convey messages back to the AV compute side. For instance, a message may be warranted in response to a request that is sent from the AV compute side to the edge device side. Such responses or messages cannot be transmitted on the one-way Ethernet network connection 160.

A limited backchannel 180 can be implemented between automotive network gateway 130 and customer-facing access point 140 to allow enumerated type data values to be transmitted. Backchannel 180 can include a non-feature rich, limited communication channel. The backchannel 180 may be a daisy-chained audio bus. Backchannel 180 may allow 32 bits of information to be transmitted at a time. Packets (or data frames) transmitted over the backchannel 180 may be limited to include enumerated type data values only. Packets may include a small unit of data, or a data word (e.g., a set of binary digits or bits) only. To allow meaningful information to be conveyed over the limited backchannel 180, the automotive network gateway 130 and the customer-facing access point 140 can be implemented with a lookup table or suitable data structure that maps different enumerated type data values to different messages (having meaningful information).

Enumerated type data values may be encoded in N number of bits, which means that there may be $2^N$ possible different enumerated type data values. Backchannel 180 may have a defined data packet format that includes a certain number of bits that can be used to transmit the enumerated type data value. Different enumerated type data values can thus convey different messages. Customer-facing access point 140 can encode messages as enumerated type data values. Automotive network gateway 130 can decode the enumerated type data values back into messages.

Systems to Support Managing Software Running on Edge Devices while Using the One-Way Ethernet Network Connection and a Limited Backchannel An AV may routinely shut down at the end of a day or shift, and may be launched (e.g., booted up) to start a new day or new shift. The AV may be shut down and re-launched for other reasons as well. As part of the launch process, the AV compute may perform checks to ensure that expected edge devices are present on the AV, and that the software and hardware versions of the edge devices are as expected. If the software version is not as expected, the AV compute may send and install a new software package. These checks can be performed before the AV drives on the road. Performing these types of operations at launch time is not trivial when the operations are to be performed within the networked environment illustrated in FIG. 1. The one-way Ethernet network connection may be used for directional data traffic, and the backchannel may be used as an acknowledgement path.

Figure 2:
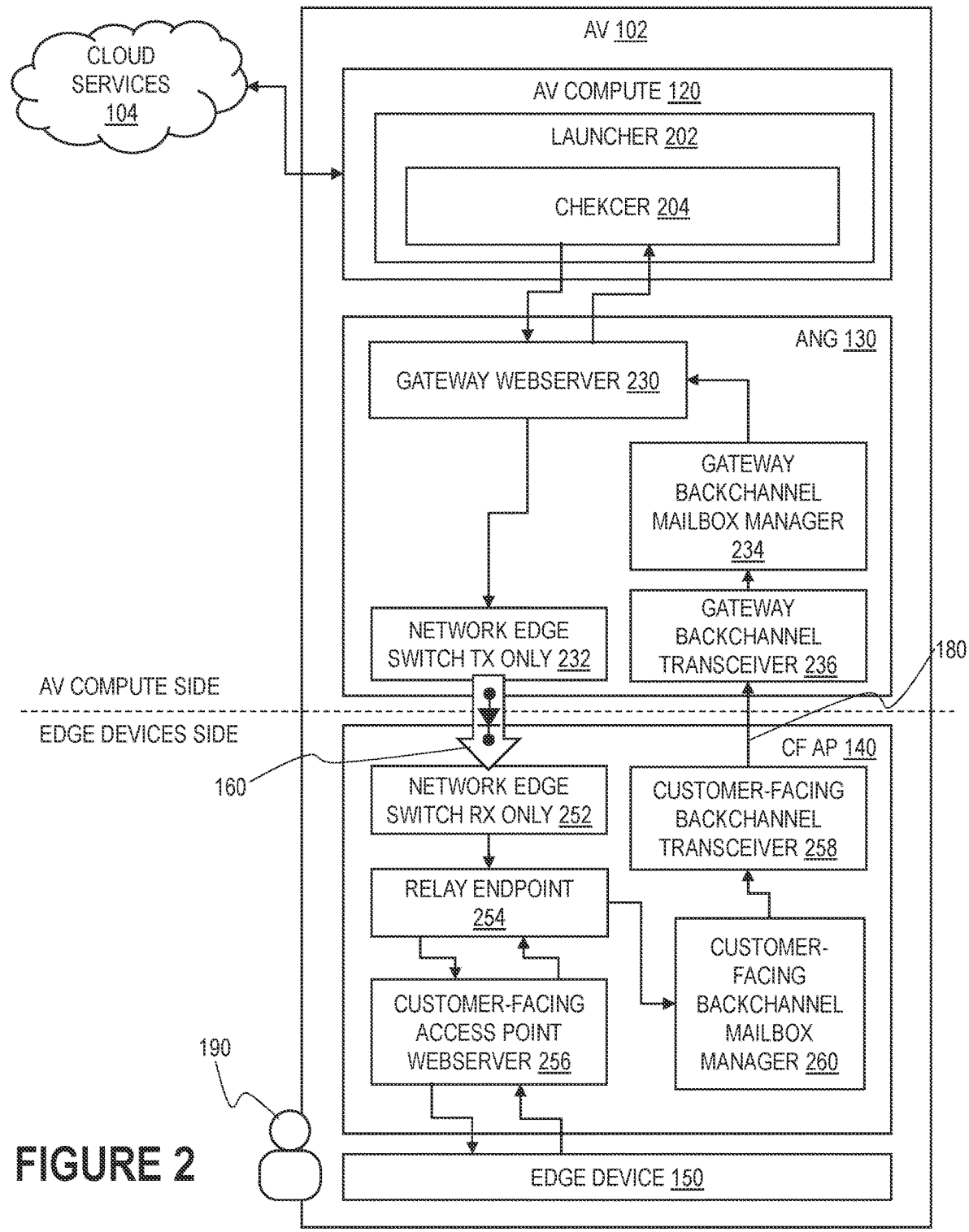
FIG. 2 illustrates exemplary system architecture that supports version checking and update of software of edge devices, according to some aspects of the disclosed technology.

FIG. 2 illustrates exemplary system architecture that supports version checking and update of software of edge devices, according to some aspects of the disclosed technology. The system architecture can be implemented within the networked environment illustrated in FIG. 1.

AV 102 may include one or more edge devices, such as edge device 150. Edge device 150 may include a computing device usable by passenger 190 of the vehicle. Edge device 150 can be a client computing device 1170 connected to the networked environment of the AV (e.g., client computing device 1170 in FIG. 11).

AV 102 may include AV compute 120 (e.g., a compute system). AV compute 120 may include a software stack implemented on one or more processors for perceiving an environment of the AV 102, prediction of objects in the environment, planning of the AV 102, and controlling the AV 102.

AV compute 120 may include launcher 202. Launcher 202 may manage one or more edge devices such as edge device 150 at launch time of the AV 102. Launcher 202 may include checker 204 to perform checks on the edge devices (e.g., edge device 150).

AV 102 may include an automotive network gateway 130. Automotive network gateway may be abbreviated as "ANG" herein and in the figures. AV 102 may include a (customer-facing) access point 140. Customer-facing may be abbreviated as "CF" herein and in the figures.

Access point may be abbreviated as "AP" herein and in the figures.

AV 102 may include a one-way Ethernet network connection 160 between the automotive network gateway 130 and the access point 140. A transmit-only (TX) network edge switch (shown as network edge switch TX only 232 in FIG. 2) may be implemented on automotive network gateway 130, and a receive-only (RX) network edge switch (shown as network edge switch RX only 252 in FIG. 2) may be implemented on customer-facing access point 140. Network edge switch TX only 232 and network edge switch RX only 252 can coordinate data traffic from automotive network gateway 130 to customer-facing access point 140 over the one-way Ethernet network connection 160. Network edge switch TX only 232 and network edge switch RX only 252 can prevent or forbid data traffic from being sent from the customer-facing access point 140 to automotive network gateway 130 via the one-way Ethernet network connection 160. Switches may be implemented in hardware and/or software.

The AV 102 may include a backchannel 180 between the automotive network gateway 130 and the access point 140. Backchannel 180 may include a daisy-chained audio bus communication channel. Backchannel 180 may be a non-feature rich, limited backchannel. A gateway backchannel transceiver 236 may be implemented on automotive network gateway 130, and a customer-facing backchannel transceiver 258 may be implemented on customer-facing access point 140. Gateway backchannel transceiver 236 and customer-facing backchannel transceiver 258 coordinate data traffic between automotive network gateway 130 to customer-facing access point 140 over the backchannel 180. Transceivers may be implemented in hardware and/or software.

Automotive network gateway 130 may include a first web server (shown as gateway web server 230 in FIG. 2). Web server may be abbreviated as "WS" herein and in the figures. Gateway web server 230 may be in communication with launcher 202, e.g., such as checker 204.

Checker 204 may send requests to and receive responses from gateway web server 230 according to an application programming interface (API). The API may follow design principles of representational state transfer (REST) architectural style. Checker 204 may transmit requests, using the API, to validate software versions of software running on one of the one or more edge devices (e.g., edge device 150). Checker 204 may transmit requests, using the API, to validate hardware versions of one of the one or more edge devices (e.g., edge device 150). Checker 204 may transmit requests, using the API, to trigger a software package targeted to one of the one or more edge devices (e.g., edge device 150) to be sent to the customer-facing access point 140. Checker 204 may transmit requests, using the API, to trigger an installation of a software package on one of the edge devices (e.g., edge device 150).

Automotive network gateway 130 may include a first backchannel mailbox manager (shown as gateway backchannel mailbox manager 234). Backchannel mailbox manager may be abbreviated as "BC MBX MGR" herein and in the figures. Gateway backchannel mailbox manager 234 may receive data frames or packets having enumerated type data values over backchannel 180, via gateway backchannel transceiver 236. Gateway backchannel mailbox manager 234 may process data frames or packets received over the backchannel 180 and obtain or extract enumerated type data values from data frames or packets received over the backchannel 180 and transmit the enumerated type data values to the first web server (i.e., gateway web server 230 in FIG. 2). Gateway backchannel mailbox manager 234 may transmit the enumerated type data values to gateway web server 230 via inter-process communication (e.g., D-bus, or ZeroMQ).

Customer-facing access point 140 may include a relay endpoint 254. Relay endpoint 254 may serve as a proxy on the customer-facing access point 140. Gateway web server 230 may direct requests to the edge devices side over the one-way Ethernet network connection 160 via relay endpoint 254 acting as a proxy. Gateway web server 230 may transmit UDP datagrams over the one-way Ethernet network connection 160 via network edge switch TX only 232 and network edge switch RX only 252 to relay endpoint 254 for processing. In some embodiments, relay endpoint 254 may encode messages into enumerated type data values. Relay endpoint 254, acting as a proxy, may direct messages or responses having the enumerated type data values to gateway web server 230 via the backchannel 180.

Customer-facing access point 140 may include a second web server (shown as customer-facing access point web server 256 in FIG. 2). Customer-facing access point web server 256 may manage edge devices such as edge device 150. The customer-facing access point web server 256 may be in communication with one or more edge devices such as edge device 150 and the relay endpoint 254. In some embodiments, the customer-facing access point web server 256 may encode messages received from edge device 150 into enumerated type data values. The customer-facing access point web server 256 may provide the enumerated type data values to relay endpoint 254. Relay endpoint 254, acting as a proxy, may send requests and receive responses in accordance with an API used by the customer-facing access point web server 256. API may be a REST API.

Customer-facing access point 140 may include a second backchannel mailbox manager (shown as customer-facing access point backchannel mailbox manager 260 in FIG. 2). The customer-facing access point backchannel mailbox manager 260 may receive the enumerated type data values from relay endpoint 254 (e.g., enumerated type data values representing responses received by relay endpoint 254 from customer-facing access point web server 256). Relay endpoint 254 may transmit messages having the enumerated type data values via inter-process communication (e.g., D-bus or ZeroMQ) to customer-facing access point backchannel mailbox manager 260. Customer-facing access point backchannel mailbox manager 260 may package the enumerated type data values into data frames or packets that can be transmitted over backchannel 180. The data frames or packets having the enumerated type data values may be transmitted to the gateway backchannel mailbox manager 234 over backchannel 180, via customer-facing backchannel transceiver 258. Backchannel 180 thus may transfer enumerated type data values from the customer-facing access point backchannel mailbox manager 260 to the gateway backchannel mailbox manager 234.

Exemplary Processes for Version Checking

Version checking, such as software version checking, hardware version checking, hardware type checking, hardware serial number checking, may be one of the tasks performed by checker 204 of FIG. 2 at launch time of an AV. Because the backchannel is limited, it is not possible for the customer-facing access point web server to transmit a string as a response to a query. Rather than querying for the version or for the serial number, checker 204 is implemented to submit validation requests to the gateway web server to confirm whether the version or serial number matches an expected version or serial number. Validation requests may solicit a yes or no response. A yes or no response can be encoded in an enumerated type data value by a web server that is servicing the validation request. The appropriate enumerated type data value may be transmitted as a response over the limited backchannel.

The gateway web server can transmit validation requests over the one-way Ethernet network connection. Relay endpoint 254 can act as a proxy and coordinate querying the customer-facing access point web server 256 and confirm whether the result of the query matches an expected string. The result may be encoded in an enumerated type data value, e.g., by the relay endpoint 254. The enumerated type data value may be transmitted over the limited backchannel. The enumerated type data value may be decoded back into a message or response, e.g., by gateway web server 230.

Figure 3:
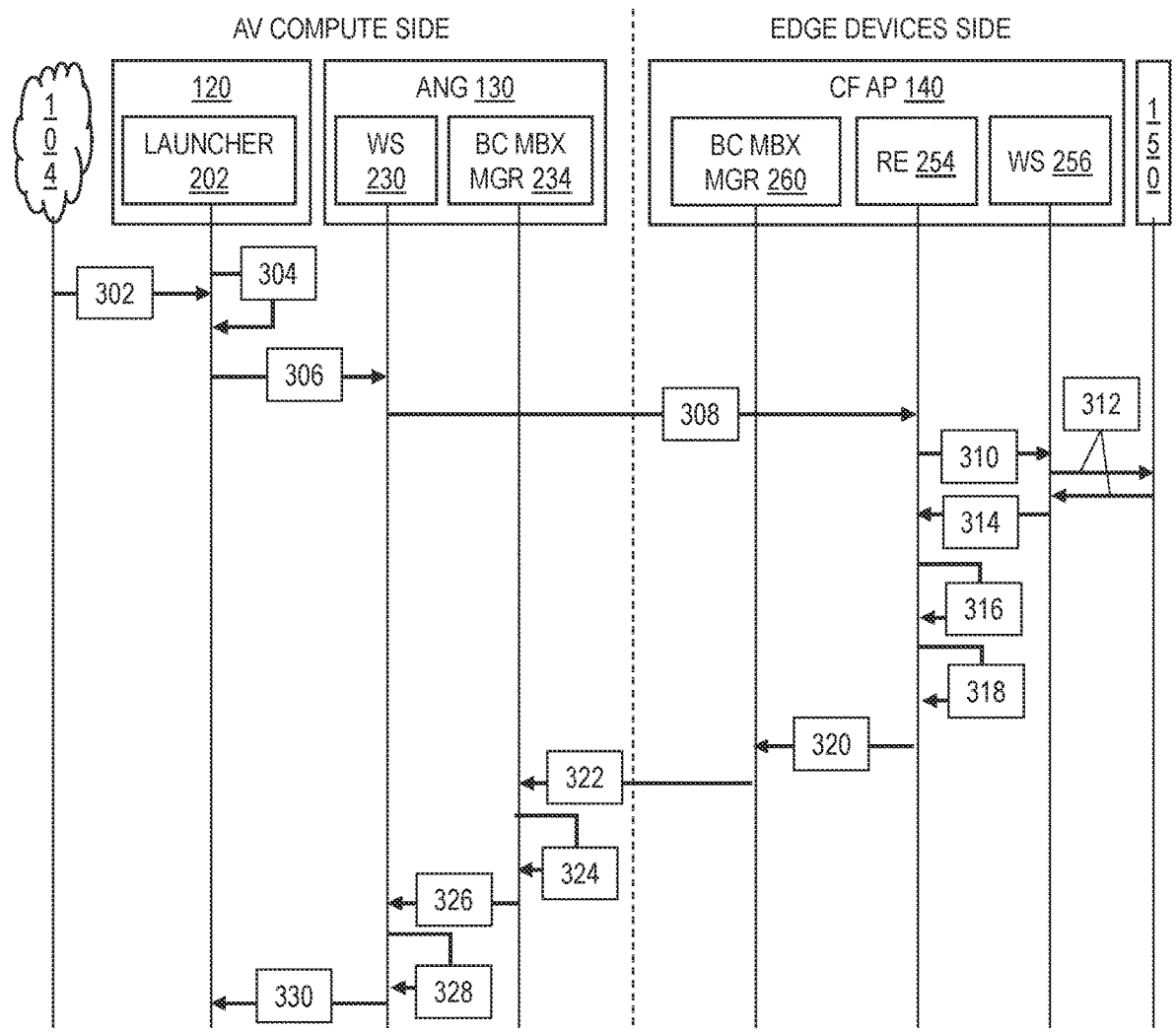
FIG. 3 is a sequence diagram illustrating version checking, according to some aspects of the disclosed technology.

FIG. 3 is a sequence diagram illustrating version checking, according to some aspects of the disclosed technology. Version checking may be performed using a configuration file that corresponds to the AV (e.g., a manifest), where the configuration file may include a list of expected edge devices and expected properties of the edge devices. Expected properties may include hardware version, software/firmware version, serial number, hardware type, network address, network name, resource locator, resource identifier, etc. As an example, FIG. 3 illustrates validating whether an edge device has an expected version string (e.g., corresponding to software/firmware version on the edge device, or hardware version of the edge device). The same process illustrated in FIG. 3 can be used to validate or check other expected properties of edge devices (e.g., properties in a string format).

Cloud services 104 may include a device software management platform remote from the AV. Launcher 202 (e.g., checker 204) may query cloud services 104 for a configuration file that corresponds to the AV (or a fleet of AVs of which the AV is a part). Launcher 202 (e.g., checker 204) may query cloud services 104 to determine the expected version string. In 302, launcher 202 may receive the configuration file or the expected version string.

In 304, launcher 202 may query a configuration file (already stored on AV compute 120) to determine the expected version string for an edge device on the AV.

In 306, launcher 202 may provide the expected version string to gateway web server 230. Gateway web server 230 implemented on automotive network gateway 130 may receive the expected version string from launcher 202 implemented on AV compute 120. Gateway web server 230 may have an API, e.g., REST API, and may have one or more uniform resource identifiers (URIs) that correspond to different functions. For version checking, the expected version string may be received at a URI corresponding to version checking provided by the API of the gateway web server 230. The expected version string may be included in a request posted to the URI corresponding to version checking.

In 308, the gateway web server 230 may transmit a version checking request having the expected version string in one or more UDP packets (or datagram) over a one-way Ethernet network connection (e.g., one-way Ethernet network connection 160 in the figures) to a relay endpoint 254 implemented on the customer-facing access point 140. The relay endpoint 254 may receive the version checking request in the one or more UDP packets. The UDP packet data format may follow a language-neutral, platform-neutral extensible mechanism, e.g., Protocol Buffer.

In 310, the relay endpoint 254 may query customer-facing access point web server 256 implemented on the customer-facing access point 140 for a current version string (e.g., actual version string of an edge device). Customer-facing access point web server 256 may have an API, e.g., REST API, and may have one or more URIs that correspond to different functions.

Relay endpoint 254 may post a request to a URI to query for the current version string in accordance with the API.

In 312, the customer-facing access point web server 256 may query the edge device 150 for the current version string. The customer-facing access point web server 256 may receive the current version string.

In 314, the customer-facing access point web server 256 may return the current version string to the relay endpoint 254. The relay endpoint 254 may receive the current version string from the customer-facing access point web server 256.

In 316, the relay endpoint 254 may compare the expected version string (received in 308) and the current version string (received in 314). The relay endpoint 254 may determine if the two strings match (or are the same) and can produce a comparison result (or a result of the comparing).

In 318, the relay endpoint 254 may encode the result of the comparing as a first enumerated type data value. Encoding may include looking up the result in a data structure (e.g., lookup table) that maps different enumerated type data values to different comparison results.

The relay endpoint 254 may look up the enumerated type data value that corresponds to the comparison result.

In 320, the relay endpoint 254 may transmit the enumerated type data value encoding the comparison result (e.g., via inter-process communication) to customer-facing access point backchannel mailbox manager 260 implemented on the customer-facing access point 140.

In 322, the customer-facing access point backchannel mailbox manager 260 may transmit over the backchannel (e.g., backchannel 180 in the figures) a response to the version checking request to a gateway backchannel mailbox manager 234 implemented on the automotive network gateway 130. The response may include the first enumerated type data value received from the relay endpoint 254. The response may be a data packet or data frame that includes the first enumerated type data value. The gateway backchannel mailbox manager 234 may receive the first enumerated type data value in response to the version checking request. The backchannel may be a limited communication channel for transmitting enumerated type data values.

In 324, the gateway backchannel mailbox manager 234 may extract or obtain the first enumerated type data value from the response received from the customer-facing access point backchannel mailbox manager 260.

In 326, the gateway backchannel mailbox manager 234 may transmit the first enumerated type data value (from 324) to the gateway web server 230, e.g., via inter-process communication.

In 328, the gateway web server 230 may decode the first enumerated type data value to determine a first message response to the version checking request. Decoding may include looking up the first enumerated type data value in a data structure (e.g., lookup table) that maps different enumerated type data values to different message responses. The gateway web server 230 may look up the message response that corresponds to the first enumerated type data value.

In 330, the gateway web server 230 may transmit the first message response to launcher 202 using the first URI corresponding to version checking (e.g., as a response to the request posted to the first URI, in accordance with the API implemented by the gateway web server 230).

Request for version checking (or validation of expected properties) may lead to results such as, version equals to expected version, and version does not equal to expected version. The results may correspond to different enumerated type data values. One enumerated type data value may correspond to a message response indicating that the expected version string matches a current version string, or a comparison result where the expected version string matches the current version string. Another enumerated type data value may correspond to a message response indicating that the expected version string does not match a current version string, or a comparison result where the expected version string does not match the current version string.

Exemplary Processes for Sending a Software Package

In some situations, the software on edge device 150 may need to be updated or changed to a different version. The software on the edge device 150 may need to be updated in response to determining that the current version string does not match the expected version string. To update the software on the edge device, a software package may be transferred to the edge devices side so that the software package may be installed onto the edge device 150. Sending or transferring a software package over a one-way Ethernet network connection 160 is not trivial. First, UDP is used since the directional network traffic disallows acknowledgements in the opposite direction. Second, because UDP data transfer is a best-effort data transfer protocol, additional mechanisms may be implemented to allow the edge devices side to acknowledge or confirm whether the transfer software package was successful (or not). The response (e.g., acknowledgement or confirmation) from the edge devices side may be transmitted back to the AV compute side via the limited backchannel using appropriate enumerated type data values.

Figure 4:
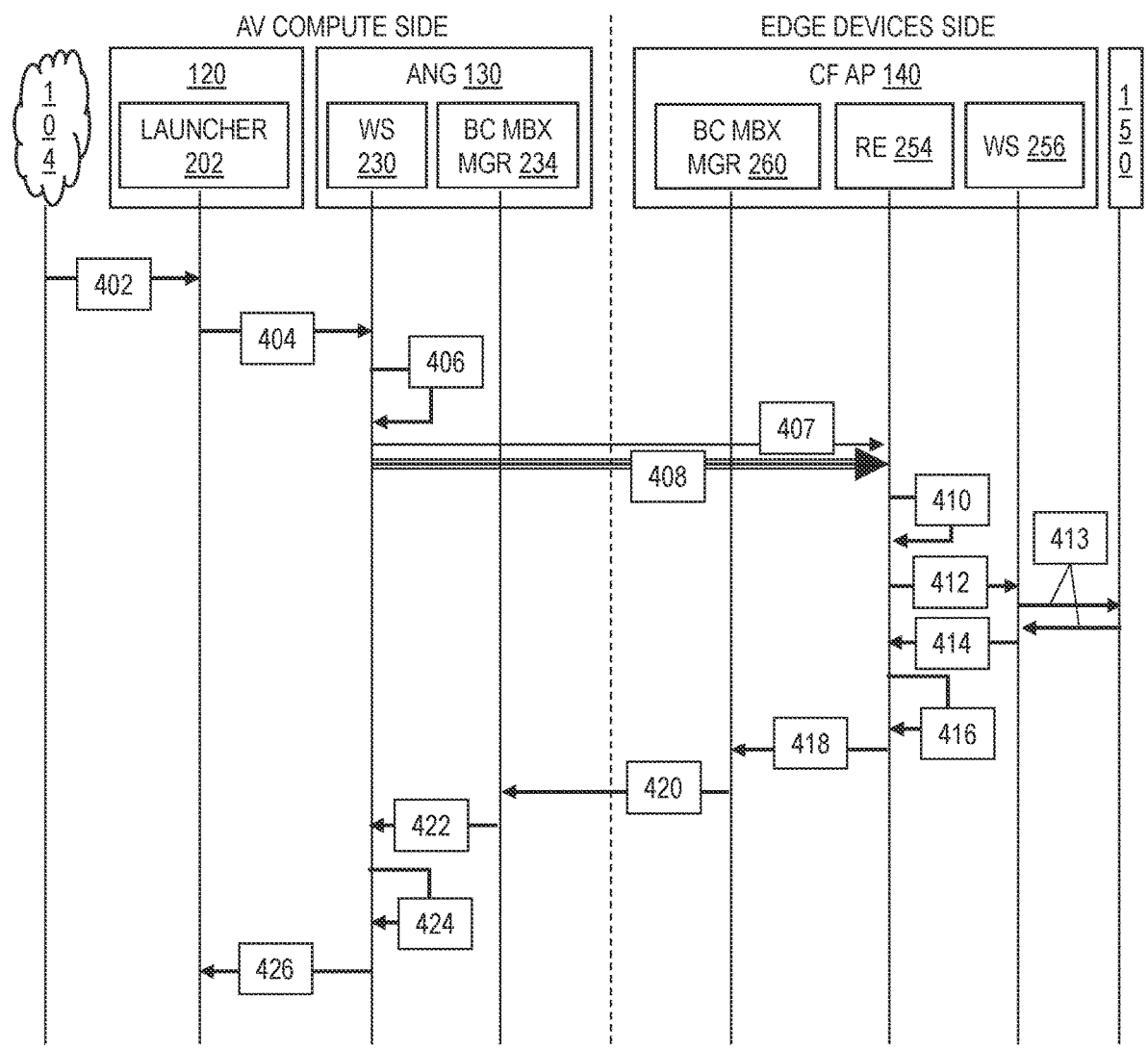
FIG. 4 is a sequence diagram illustrating sending software over the one-way Ethernet network connection, according to some aspects of the disclosed technology.

FIG. 4 is a sequence diagram illustrating sending software over the one-way Ethernet network connection, according to some aspects of the disclosed technology. FIG. 4 illustrates sending a software package to the edge devices side. The same process illustrated in FIG. 4 can be used to transfer other types of files or blobs to the edge devices side.

In 402, launcher 202 (e.g., checker 204 in FIG. 2) may download a software package from cloud services 104 (e.g., device software management platform).

In 404, gateway web server 230 may receive a transfer request of a software package at a second URI corresponding to transfer of software packages from launcher 202. Gateway web server 230 may receive the transfer request posted to the second URI. Gateway web server 230 may receive the software package.

In 406, gateway web server 230 may break up or transform the software package (received in 404) into smaller UDP packets. Gateway web server 230 may prepare the software package so that the software package is suitable for transmission over the one-way Ethernet network connection (e.g., one-way Ethernet network connection 160). Gateway web server 230 may determine metadata associated with the software package and/or the smaller UDP packets making up the software package.

In 408, gateway web server 230 may transmit the UDP packets of the software package over the one-way Ethernet network connection to relay endpoint 254. The relay endpoint 254 may receive from the gateway web server 230 over the one-way Ethernet network connection UDP packets corresponding to a software package. The UDP packet data format (e.g., serializing the software package) may follow a language-neutral, platform-neutral extensible mechanism, e.g., Protocol Buffer.

In some embodiments, gateway web server 230 may optionally first transmit a file transfer preparation (UDP) packet to relay endpoint 254 in 407 (before the smaller UDP packets having the software package is transmitted to the relay endpoint 254 in 408). The file transfer preparation packet can include the metadata about the software package and/or the smaller UDP packets making up the software package. The metadata can include one or more of: file size, checksum, hash, number of packets expected, etc. The metadata may inform relay endpoint 254 about the upcoming transfer of the software package. The metadata can be stored or remembered at the relay endpoint 254, so that the relay endpoint 254 is prepared to receive the software package file transfer in 408 and to verify the validity of the file. In some cases, the metadata can enable the relay endpoint 254 to confirm that all packets have been received. In some cases, replies or acknowledgements to the file transfer preparation packet over the backchannel 180 from the edge devices side to the AV compute side is not required. Using a file transfer preparation packet can offer some technical benefits. The metadata can allow the relay endpoint 254 to dynamically adjust the size of its memory space for the upcoming file. The metadata can set the expectation for the file transfer and allow the next step to transfer only the file contents over the one-way Ethernet connection. The mechanism can allow the relay endpoint 254 to implement a "lock-free" multi-threading method for the file receiving step over UDP packets, which improves the processing speed of the relay endpoint 254. The file transfer preparation packet can simplify the multi-threaded jobs to receive the UDP packets at the relay endpoint 254. After receiving the file transfer preparation packet, the relay endpoint 254 only writes the payload of the UDP packets (e.g., a small chunk of the software package image) to the memory space. Since these UDP payloads do not overlap with each other in memory space, these threads can write to the memory space at the same time without locking the steps.

In 410, the relay endpoint 254 may reconstruct a file of the software package from the UDP packets. The relay endpoint 254 may confirm all UDP packets have been received. The relay endpoint 254 may perform parallel processing of the UDP packets. The relay endpoint 254 may check one or more hashes (or checksums) to confirm the integrity of software package received. The one or more hashes or checksums may be obtained from the file transfer preparation packet. In some cases, the relay endpoint 254 may use the metadata received in 407 to prepare for and process the file transfer.

In 412, the relay endpoint 254 may transfer the file of the software package to the customer-facing access point web server 256. The relay endpoint 254 may post a request to transfer the file to one of the URIs of the customer-facing access point web server 256 in accordance with the API implemented by the customer-facing access point web server 256. The API may be a REST API.

In 413, the customer-facing access point web server 256 may transmit the file to the edge device 150. The edge device 150 may acknowledge receipt of the file.

In 414, the relay endpoint 254 may receive, from the customer-facing access point web server 256, a response indicating that the file transfer was successful (e.g., in accordance with the API implemented by the customer-facing access point web server 256).

In 416, the relay endpoint 254 may encode the response indicating that the file transfer was successful as a second enumerated type data value. The second enumerated type data value can correspond to a message response indicating that the software package was received successfully, e.g., at the relay endpoint 254 or the customer-facing access point web server 256. Encoding may involve looking up the response indicating that the file transfer was successful in a data structure (e.g., lookup table) that maps different responses indicating the success or failure of the file transfer to different enumerated type data values. The relay endpoint 254 may look up the enumerated type data value that corresponds to the response indicating that the file transfer was successful.

In 418, the relay endpoint 254 may relay (e.g., via inter-process communication) the second enumerated type data value to the customer-facing access point backchannel mailbox manager 260, the second enumerated type data value indicating that the file transfer was successful. In some cases, if the file transfer was unsuccessful, the customer-facing access point backchannel mailbox manager 260 may receive a different enumerated type data value indicating that the file transfer was unsuccessful.

In 420, the customer-facing access point backchannel mailbox manager 260 may transmit over the backchannel (e.g., backchannel 180 in the figures) to the gateway backchannel mailbox manager 234 the response to the UDP packets corresponding to the software package. The response may include the second enumerated type data value (from 418). The customer-facing access point backchannel mailbox manager 260 may package the second enumerated type data value into a data frame or packet suitable for transmission over the backchannel. The gateway backchannel mailbox manager 234 may receive the response over the backchannel from customer-facing access point backchannel mailbox manager 260. Depending on the enumerated type data value included in the response, the response may acknowledge or confirm the software package was transferred to the edge devices side successfully or unsuccessfully.

In 422, the gateway backchannel mailbox manager 234 may extract or obtain the second enumerated type data value (received in 420) and transmit the second enumerated type data value to gateway web server 230, e.g., via inter-process communication.

In 424, the gateway web server 424 may decode the second enumerated type data value (received in 422) to determine a second message response to the transfer request (e.g., transfer request from 404) corresponding to the second enumerated type data value. Decoding may include looking up the second enumerated type data value in a data structure (e.g., a lookup table) that maps one or more enumerated type data values to one or more message responses to the transfer request.

In 426, the gateway web server 230 may transmit the second message response to launcher 202 (e.g., checker 204 in FIG. 2). The second message response may acknowledge or confirm that the software package has been transferred to the edge devices side successfully. The second message response may be transmitted via the second URI corresponding to transfer of software packages.

The second message response (indicating that the software package was transferred successfully) may cause the launcher 202 (e.g., checker 204 in FIG. 2) to make a request to install the transferred software package on the edge device. The request to install the software package may follow a similar process illustrated in FIG. 3.

Referring back to FIG. 3, in 306, the launcher 202 (e.g., checker 204 in FIG. 2) may transmit a request to install the software package (or update the software on the edge device 150) to a third URI corresponding to software installation requests at the gateway web server 230. In 306, the gateway web server 230 may receive from the launcher 202 (e.g., checker 204 in FIG. 2) an installation request at a third URI corresponding to software installation requests. The request may be transmitted in accordance with the API implemented by the gateway web server 230 (e.g., a REST API).

In 308, the gateway web server 230 may transmit one or more UDP packets having an instruction to install the software package over the one-way Ethernet network connection (e.g., one-way Ethernet network connection 160 in the figures) to the relay endpoint 254. The relay endpoint 254 may receive one or more UDP packets having an instruction to install a software package from the gateway web server 230 over the one-way Ethernet network connection. The UDP packet data format may follow a language-neutral, platform-neutral extensible mechanism, e.g., Protocol Buffer.

In 310, the relay endpoint 254 may transmit to the customer-facing access point web server 256 a request to install the software package.

In 312, customer-facing access point web server 256 may cause the software package to be installed on edge device 150, and edge device 150 may provide a result of the request to install the software package to customer-facing access point web server 256. The result may confirm that the software package has been installed successfully (or not successfully).

In 314, the relay endpoint 254 may receive from the customer-facing access point web server 256 a response indicating a result of the request to install the software package (e.g., a result in 312). Different information may be conveyed in the response. A response indicating a result can be an acknowledgement that the request was received. A response indicating a result can include confirmation that the software package has been successfully installed. A response indicating a result can be a message indicating that an installation of the software package encountered an error.

In 318, the relay endpoint 254 may encode the result of the request to install the software package as a third enumerated type data value. Encoding may include looking up an enumerated type data value that corresponds to the response indicating the result in a data structure (e.g., a lookup table) that maps responses indicating different results to different enumerated type data values. The relay endpoint 254 may look up the enumerated type data value that corresponds to the installation result. The third enumerated type data value may correspond to a message to a message response indicating that the instruction to install the software package was received successfully at the relay endpoint. The third enumerated type data value may correspond to a message response indicating that the software package was successfully installed. The third enumerated type data value may correspond to message response indicating that an installation of the software package encountered an error.

In 320, the relay endpoint 254 may relay to the customer-facing access point backchannel mailbox manager 260 the third enumerated data value indicating the result, e.g., via inter-process communication.

In 322, the customer-facing access point backchannel mailbox manager 260 may package the third enumerated data value into a response to be transmitted over the backchannel (e.g., backchannel 180 in the figures), and transmits the response to the gateway backchannel mailbox manager 234. The response may serve as a response to the UDP packet having the instruction to install the software package (in 308). The response may be a data frame or packet suitable for transmission over the backchannel. The response can include the third enumerated type data value (from 320). The gateway backchannel mailbox manager 234 may receive the third enumerated type data value in response to the UDP packet having the instruction to install the software package (in 308) over the backchannel.

In 324, the gateway backchannel mailbox manager 234 may extract or obtain the third enumerated type data value from the response transmitted over the backchannel. In 326, the gateway backchannel mailbox manager 234 may transmit, e.g., via inter-process communication, the third enumerated type data value extracted in 324 to the gateway web server 230.

In 328, the gateway web server 230 may decode the third enumerated type data value to determine a third message response to the installation request corresponding to the third enumerated type data value. Decoding may include looking up the third enumerated type data value in a data structure (e.g., a lookup table) that maps different enumerated type data values to different message responses to the installation request.

In 330, the gateway web server 230 may transmit the third message response to the launcher 202 (e.g., checker 204 in FIG. 2), using the third URI corresponding to installation of software installation requests (e.g., in accordance with the API implemented by the gateway web server 230).

Exemplary Timeout Mechanisms

Another challenge to the processes illustrated by FIGS. 3-4 is that faults (e.g., lost packets, failed-to-respond situations, delayed processing, etc.) can occur at different points of the system. It can be a bigger challenge when requests and data are transferred using UDP over the one-way Ethernet connection and cannot benefit from TCP-like acknowledgements.

Implementing timeout mechanisms appropriately can alleviate some of these concerns, and help tolerate faults in the system.

Figure 5:
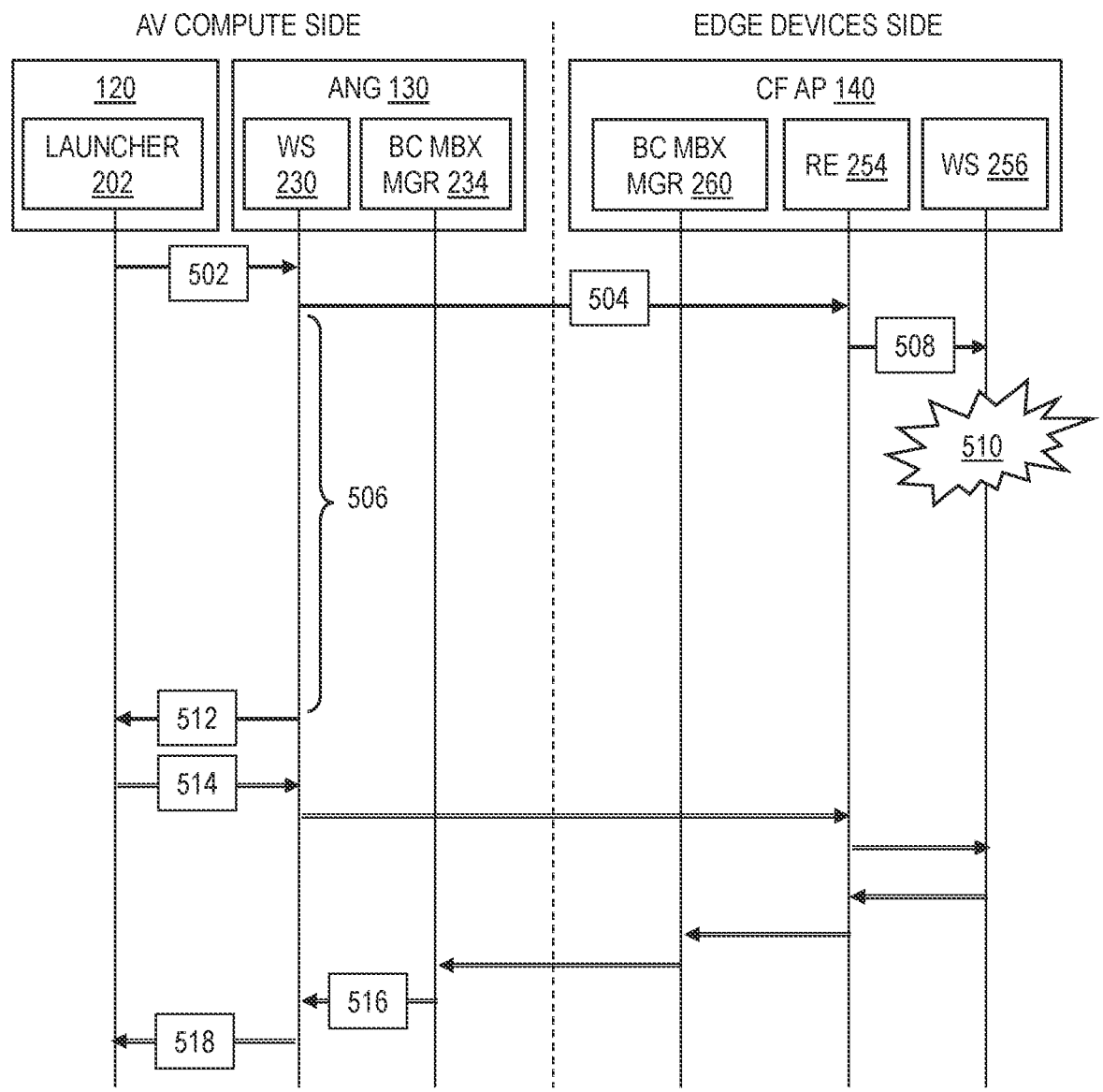
FIG. 5 is a sequence diagram illustrating a timeout occurring with a request in the system architecture and retrying the request after the timeout, according to some aspects of the disclosed technology.

FIG. 5 is a sequence diagram illustrating a timeout occurring with a request in the system architecture and retrying the request after the timeout, according to some aspects of the disclosed technology. Exemplary requests that may benefit from the timeout and retry can include version checking, expected property validation, transfer request of software package, request to update/install a software package, request to reboot an edge device, etc.

In 502, launcher 202 may send a request to gateway web server 230, using a specific URI for the request.

In 504, gateway web server 230 may transmit a request (e.g., version checking request) over the one-way Ethernet network connection to relay endpoint 254. The request may be posted to a URI for version checking. The request may be posted to a URI for transfer of software packages. The request may be posted to a URI corresponding to software installation requests. In some cases, gateway web server 230 may transmit UDP data packets of a software package in 504 as part of a request to transfer the software package. In response to performing 504, gateway web server 230 may set a first timer.

In 508, relay endpoint 254 may transmit the request (e.g., version checking request, transmitting UDP packets of the software package, transmitting one or more UDP packets having an instruction to install a software package, etc.) to customer-facing access point web server 256. In 510, a fault may occur, e.g., in customer-facing access point web server 256, and relay endpoint 254 does not receive a response from customer-facing access point web server 256.

The first timer may expire, as illustrated by the first duration 506, and the gateway web server 230 does not receive a response from the edge devices side before the first timer expires. For instance, the relay endpoint 254 does not receive a response from customer-facing access point web server 256, customer-facing access point backchannel mailbox manager 260 does not receive a response from the relay endpoint 254, the gateway backchannel mailbox manager 234 does not receive a data frame or packet having an enumerated type data value from the customer-facing access point backchannel mailbox manager 260, and the gateway web server 230 does not receive a response from the gateway backchannel mailbox manager 234. Failure to receive a response may occur in any part of the chain in the process.

In 512, gateway web server 230 may transmit a failure message to launcher 202 using the specific URI used in 502 due to the first timer expiring and the gateway web server 230 did not receive a response from the edge devices side before the first timer expires.

In response to receiving the failure message, launcher 202 may retry the request again in 514. In the illustration, the retry is successful in receiving a response from the edge devices side before the first timer expires. In 516, the gateway web server 230 may receive a message response before the first timer expires. In 518, gateway web server 230 can post a response back to launcher 202, in response to the request posted in 512.

Depending on the type of request, the duration of the timer being set may differ. For example, a duration for a timer corresponding to a version checking request may be shorter than a duration for a timer corresponding to a software installation request. In other words, the timeouts can vary depending on the type of request being serviced by the gateway web server 230.

Figure 6:
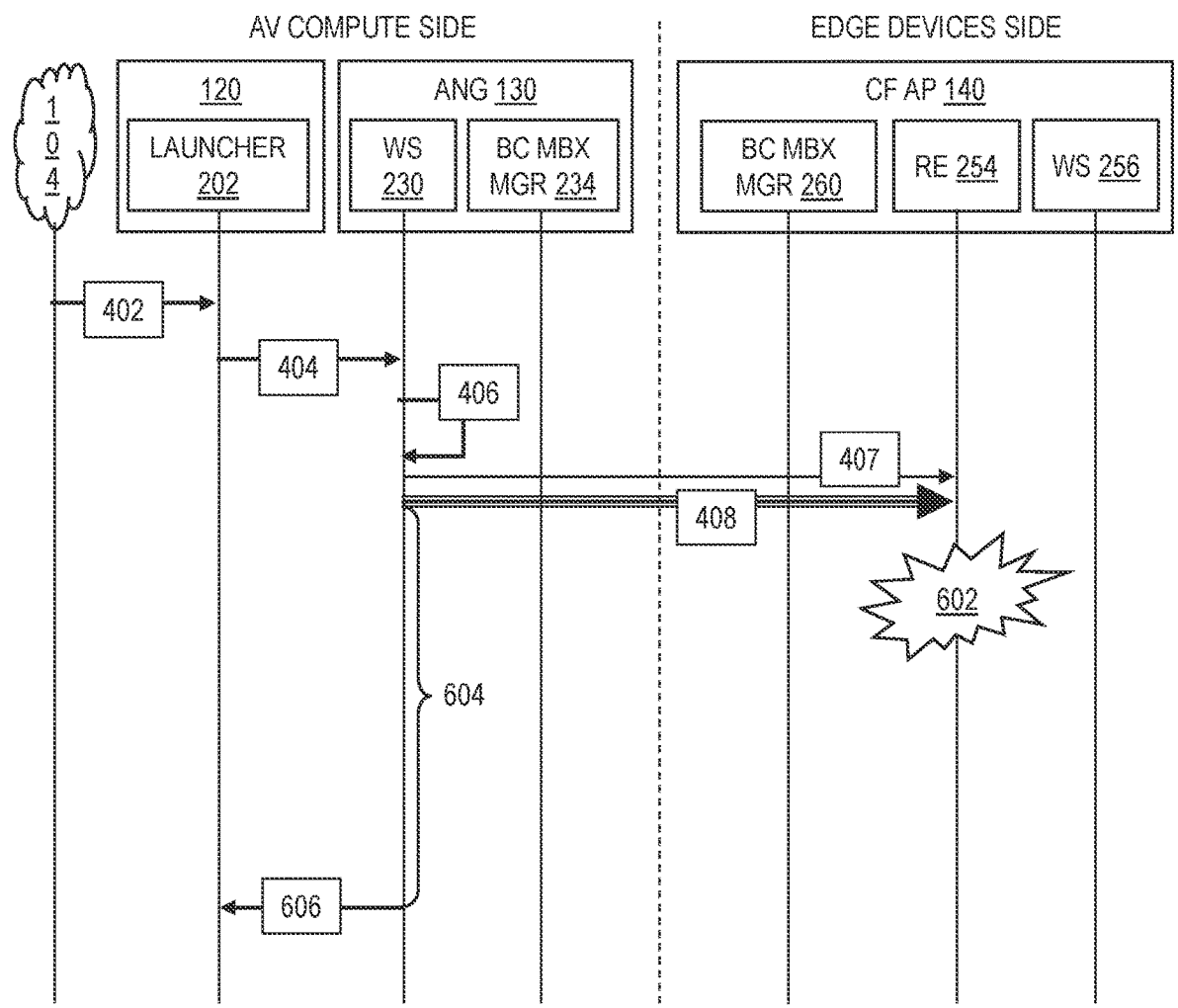
FIG. 6 is a sequence diagram illustrating another timeout occurring with transfer of a software package, according to some aspects of the disclosed technology.

FIG. 6 is a sequence diagram illustrating another timeout occurring with transfer of a software package, according to some aspects of the disclosed technology. The sequence diagram is similar to FIG. 4, except that a failure may have occurred in a part of the process. In response to performing 408, gateway web server 230 may set a second timer. In 602, a failure may have occurred at the relay endpoint 254. In one example, the relay endpoint 254 may not have received all UDP packets. In another example, data in the UDP packets may have been corrupted. In yet another example, the reconstructed software package may fail checksum. The second timer may expire, as illustrated by the second duration 604, and the gateway web server 230 does not receive a response from the edge devices side, e.g., due to the failure occurring in 602, before the second timer expires. In 606, in response to not receiving a response from the edge devices side (e.g., not receiving an enumerated type data value from the customer-facing access point backchannel mailbox manager 260 at the gateway backchannel mailbox manager 234) before the second timer expires, the gateway web server 230 may transmit a failure message to launcher 202.

Figure 7:
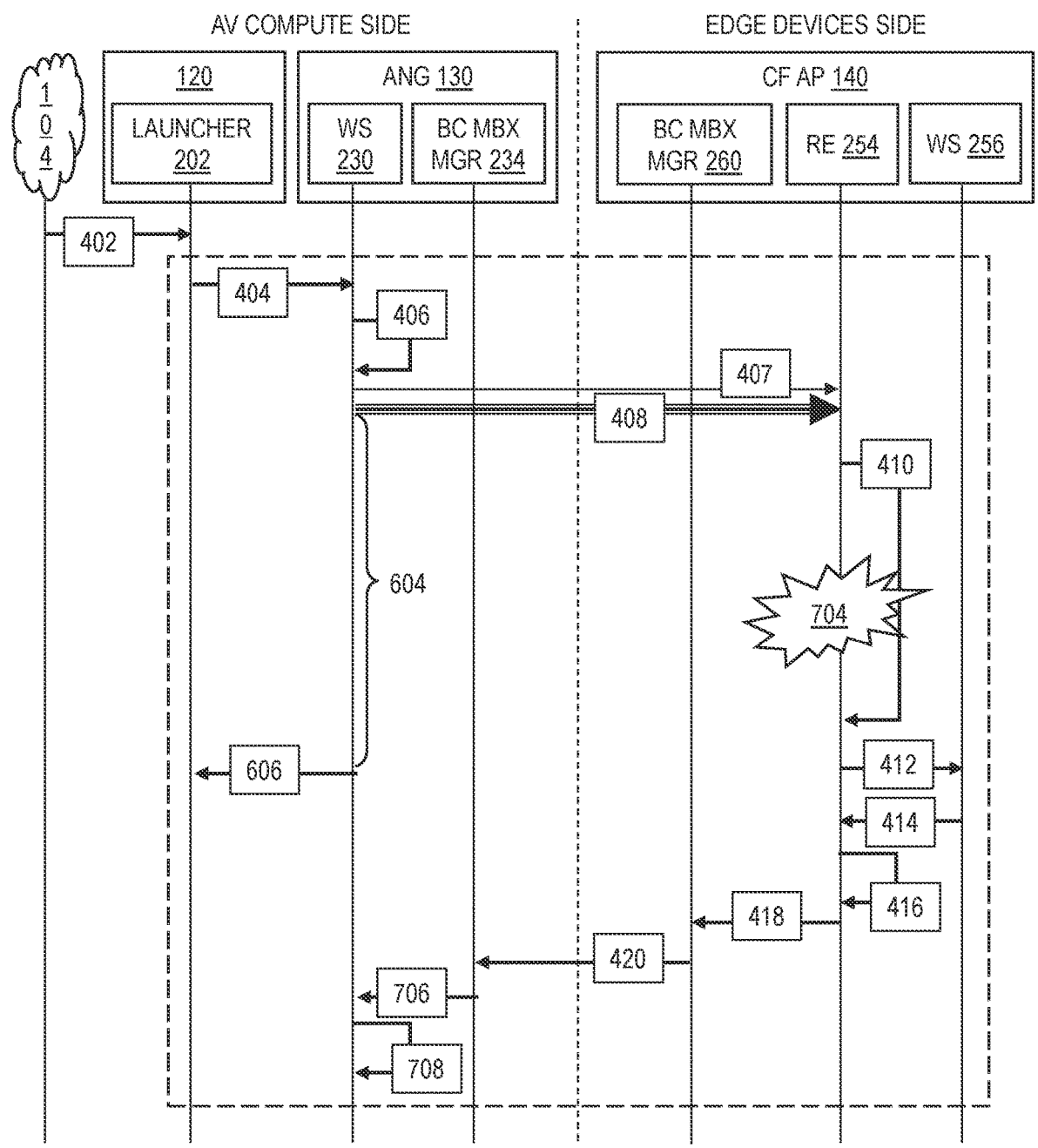
FIG. 7 is a sequence diagram illustrating a processing delay occurring with processing of a software package in the system architecture and logging of a delayed response, according to some aspects of the disclosed technology.

FIG. 7 is a sequence diagram illustrating a processing delay occurring with processing of a software package in the system architecture and logging of a delayed response, according to some aspects of the disclosed technology. The sequence diagram is similar to FIGS. 4 and 6, except that a processing delay may have occurred in a part of the process. In response to performing 408, gateway web server 230 may set a second timer. In 704, a processing delay may have occurred at the relay endpoint 254 (or a different part of the process, such as customer-facing access point web server 256). The second timer may expire, as illustrated by the second duration 604, and the gateway web server 230 does not receive a response from the edge devices side, e.g., due to the processing delay occurring in 410, before the second timer expires. In 606, in response to not receiving a response from the edge devices side (e.g., not receiving an enumerated type data value from the customer-facing access point backchannel mailbox manager 260 at the gateway backchannel mailbox manager 234) before the second timer expires, the gateway web server 230 may transmit a failure message to launcher 202. In 706, the gateway web server 230 may eventually receive a delayed response from the edge devices side (e.g., gateway web server 230 receives a delayed response from the gateway backchannel mailbox manager 234) after the second timer expires. In 708, the gateway web server 230 may log that the response received in 706 was delayed or late. Logging may track whether the processing delay is persistent, and/or if the duration 604 may need to be adjusted to account for longer processing time. Logging may help track problematic events in the AV (such as excessive delay). A monitor (not shown) may be implemented on the AV to monitor for such events.

Figure 8:
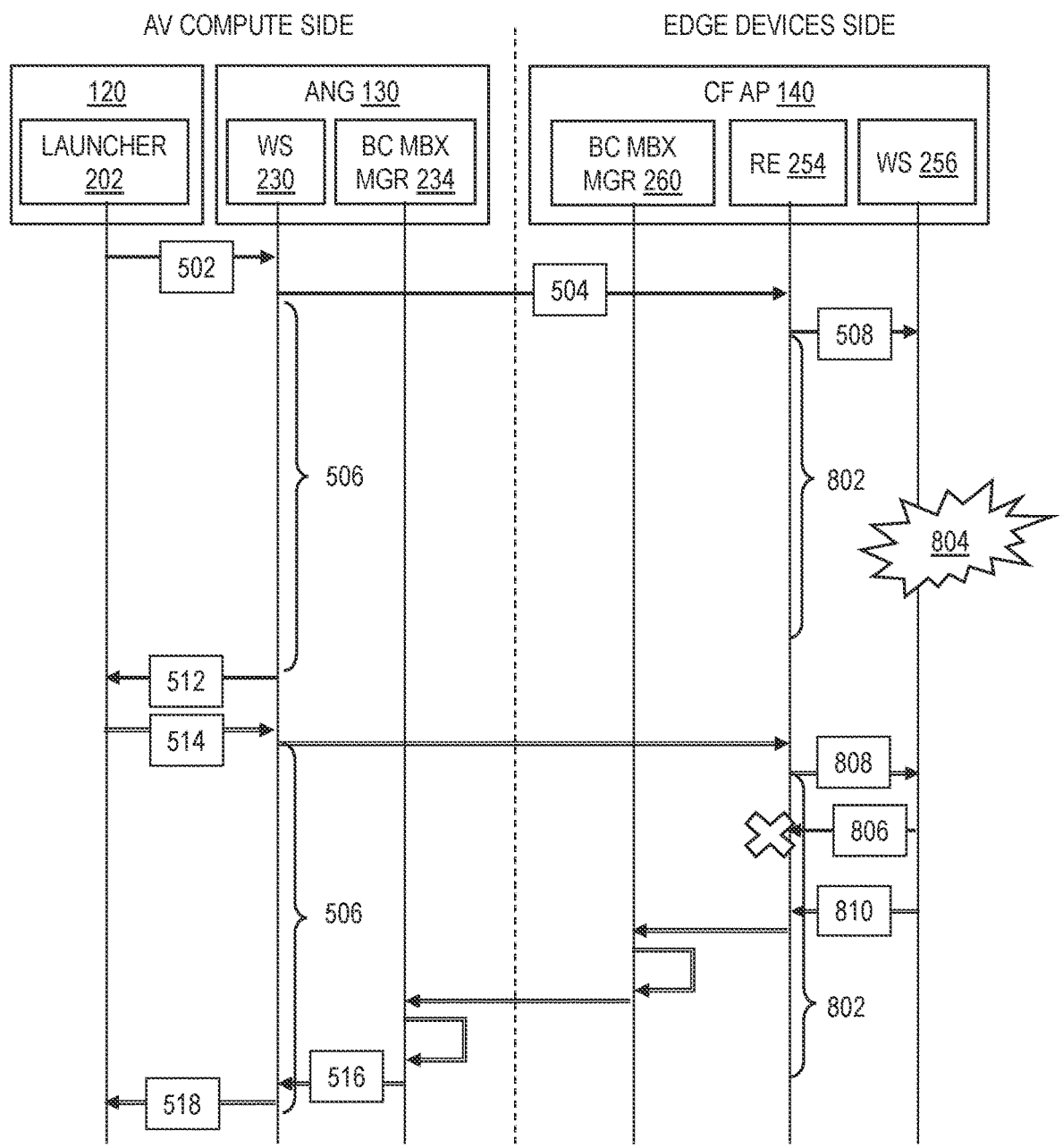
FIG. 8 is a sequence diagram illustrating a first timeout and a second timeout, retrying after the first timeout, and ignoring a delayed response after expiration of the second timeout, according to some aspects of the disclosed technology.

FIG. 8 is a sequence diagram illustrating a first timeout and a second timeout, retrying after the first timeout, and ignoring a delayed response after expiration of the second timeout, according to some aspects of the disclosed technology. The sequence diagram is similar to FIG. 5, except that a processing delay may have occurred in a part of the process. In 508, the relay endpoint 254 may transmit a request to customer-facing access point web server 256. In response to performing 508, the relay endpoint 254 may set a further time having a duration 802. Because of the processing delay in 804, gateway web server 230 may transmit a failure response to launcher 202 because the gateway web server 230 did not receive a response from the edge devices side before the first timer having duration 506 expires (i.e., first timeout), and the launcher 202 retries in 514 with a new request. In 804, a processing delay may occur. In 806, relay endpoint 254 may receive a late response to the request sent in 508 from the customer-facing access point web server 256, after the further timer having the duration 802 has expired (i.e., second timeout). This late response may create a race condition because relay endpoint 254 receives the late response in 806 before the relay endpoint 254 receives a response in 810 to the request sent in 808 for the retry, when the late response is stale or old (the relay endpoint 254 may expect to receive the response 810 for the retry, and not the late response in 806). The relay endpoint 254 may invalidate the late response received in 806. The duration 802 is preferably shorter than the duration 506, so as to avoid the race condition created by the late response received in 806.

Computer-Implemented Methods for Managing Software Updates of Edge Devices

Figure 9:
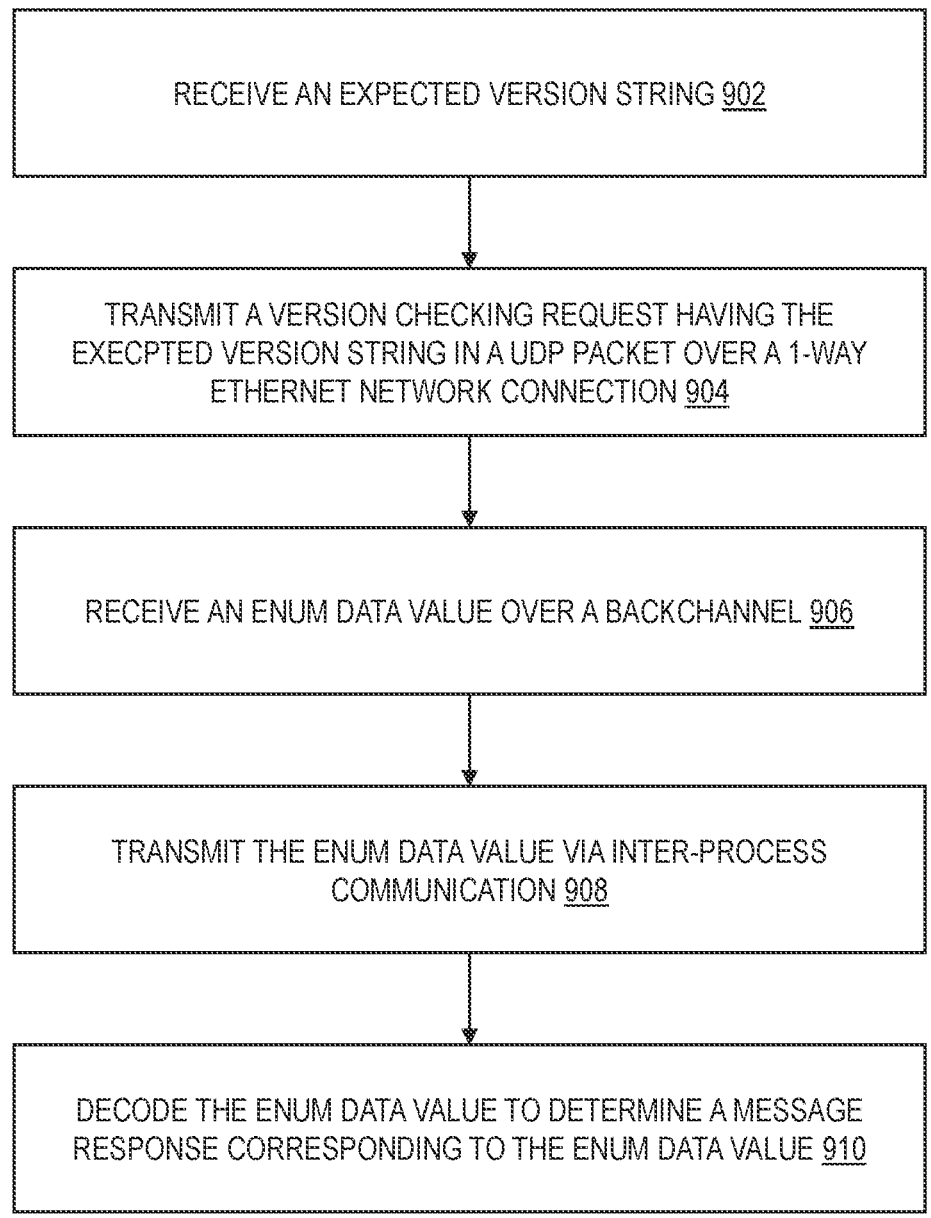
FIG. 9 is a flow diagram illustrating a method for managing software update of edge devices over a one-way Ethernet network connection, according to some aspects of the disclosed technology.

FIG. 9 is a flow diagram illustrating a method for managing software update of edge devices over a one-way Ethernet network connection, according to some aspects of the disclosed technology. The method may be implemented on systems such as the one illustrated in FIGS. 2, 11, and 12. In 902, a web server implemented on an automotive network gateway (e.g., gateway web server 230 of automotive network gateway 130) may receive, from a launcher implemented on a compute system of the vehicle (e.g., launcher 202 on AV compute 120), an expected version string at a first URI corresponding to version checking. In 904, the web server may transmit a version checking request having the expected version string in one or more UDP packets over a one-way Ethernet network connection (e.g., one-way Ethernet network connection 160) to a relay endpoint implemented on an access point (e.g., relay endpoint 254 of customer-facing access point 140). In 906, a backchannel mailbox manager implemented on the automotive network gateway (e.g., gateway backchannel mailbox manager 234 of automotive network gateway 130) may receive a first enumerated type data value over a backchannel (e.g., backchannel 180), in response to the version checking request. In 908, the backchannel mailbox manager may transmit the first enumerated type data value to the web server via inter-process communication. In 910, the web server may decode the first enumerated type data value to determine a first message response to the version checking request corresponding to the first enumerated type data value.

Figure 10:
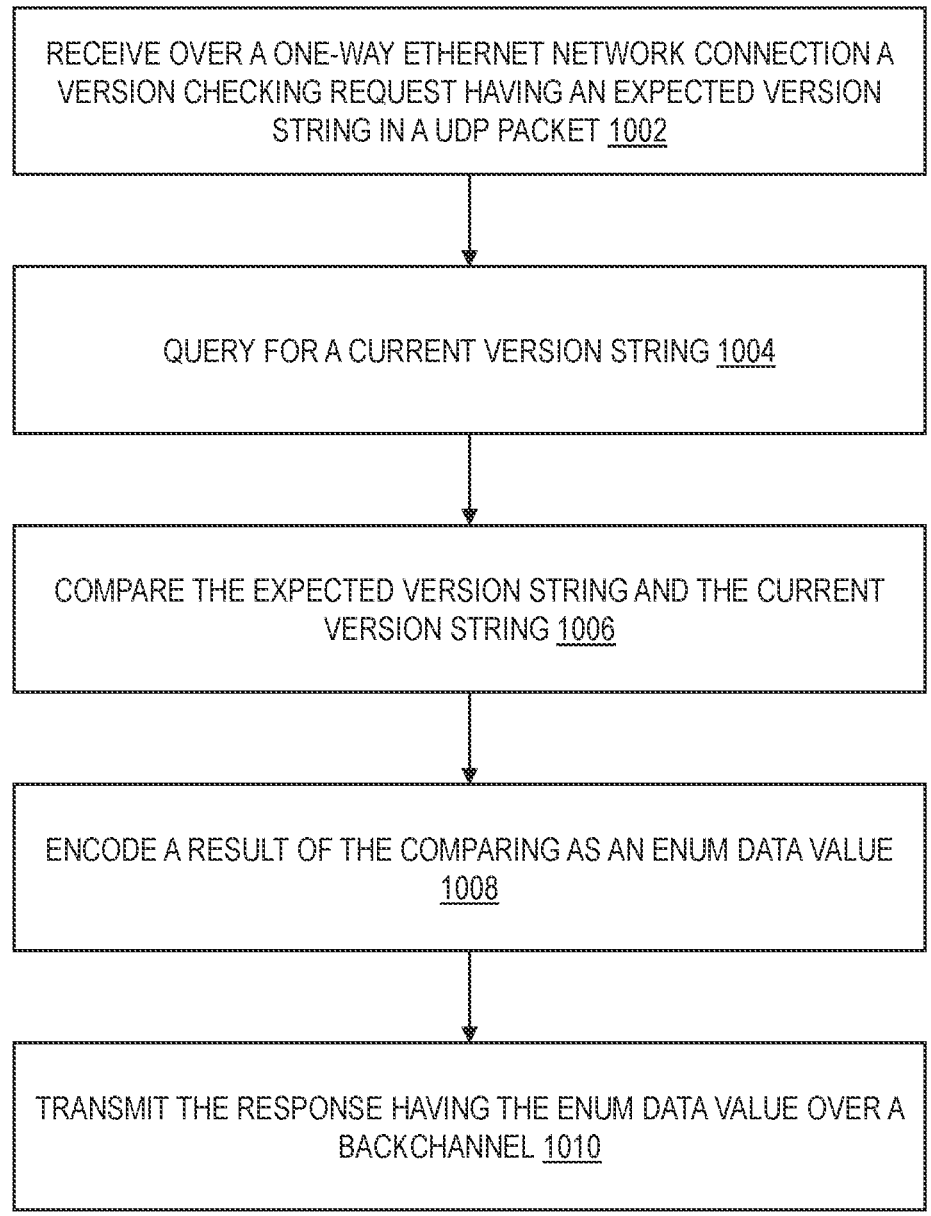
FIG. 10 is a flow diagram illustrating another method for managing software update of edge devices over a one-way Ethernet network connection, according to some aspects of the disclosed technology.

FIG. 10 is a flow diagram illustrating another method for managing software update of edge devices over a one-way Ethernet network connection, according to some aspects of the disclosed technology. The method may be implemented on systems such as the one illustrated in FIGS. 2, 11, and 12. In 1002, a relay endpoint implemented on an access point (e.g., relay endpoint 254 of customer-facing access point 140) may receive, from a web server implemented on an automotive network gateway (e.g., gateway web server 230 of automotive network gateway 130) over a one-way Ethernet network connection (e.g., one-way Ethernet network connection 160), a version checking request having an expected version string in one or more UDP packets. In 1004, the relay endpoint may query a web server implemented on the access point (e.g., customer-facing access point web server 256) for a current version string. In 1006, the relay endpoint may compare the expected version string and the current version string. In 1008, the relay endpoint may encode a result of the comparing as a first enumerated type data value. In 1010, a backchannel mailbox manager implemented on the access point (e.g., customer-facing access point backchannel mailbox manager 260) may transmit over a backchannel (e.g., backchannel 180) to a backchannel mailbox manager implemented on the automotive network gateway (e.g., gateway backchannel mailbox manager 234 of automotive network gateway 130), a response to the version checking request. The response can have the first enumerated type data value. Responses transmitted over the backchannel may include data frames or packets suitable for transmission over the backchannel.

Exemplary AV Management System

Turning now to FIG. 11, this figure illustrates an example of an AV management system 1100, in which some of the aspects of the present disclosure can be implemented. One of ordinary skill in the art will understand that, for the AV management system 1100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1100 includes an AV 102, a data center 1150, and a client computing device 1170. The AV 102, and the data center 1150 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 may navigate about roadways without a human driver based on sensor signals generated by multiple sensor systems 1104, 1106, and 1108. The sensor systems 1104-1108 may include different types of sensors and may be arranged about the AV 102. For instance, the sensor systems 1104-1108 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1104 may be a camera system, the sensor system 1106 may be a LIDAR system, and the sensor system 1108 may be a RADAR system. Other embodiments may include any other number and type of sensors.

AV 102 may also include several mechanical systems that may be used to maneuver or operate AV 102. For instance, mechanical systems may include vehicle propulsion system 1130, braking system 1132, steering system 1134, safety system 1136, and cabin system 1138, among other systems. Vehicle propulsion system 1130 may include an electric motor, an internal combustion engine, or both. The braking system 1132 may include an engine brake, a wheel braking system (e.g., a disc braking system that utilizes brake pads), hydraulics, actuators, and/or any other suitable componentry configured to assist in decelerating AV 102. The steering system 1134 may include suitable componentry configured to control the direction of movement of the AV 102 during navigation. Safety system 1136 may include lights and signal indicators, a parking brake, airbags, and so forth. The cabin system 1138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 1138 may include one or more client interfaces (e.g., GUIs, Voice User Interfaces (VUIs), etc.) for controlling certain aspects of the mechanical systems 1130-1138.

AV 102 may include an AV compute 120 (e.g., AV compute 120 illustrated in FIGS. 1-8) that is in communication with the sensor systems 1104-1108, the mechanical systems 1130-1138, the data center 1150, and the client computing device 1170, among other systems. The AV compute 120 may include one or more processors and memory, including instructions that may be executed by the one or more processors. The instructions may make up one or more software stacks or components responsible for controlling the AV 102; communicating with the data center 1150, the client computing device 1170, and other systems; receiving inputs from riders, passengers, and other entities within the AV's environment; logging metrics collected by the sensor systems 1104-1108; and so forth. In this example, the AV compute 120 includes a perception stack 1112, a mapping and localization stack 1114, a planning stack 1116, a control stack 1118, a communications stack 1120, an HD geospatial database 1122, and an AV operational database 1124, among other stacks and systems.

AV 102 may include automotive network gateway 130, one-way Ethernet network connection 160, customer-facing access point 140, edge device 150, and backchannel 180. These components are illustrated in FIGS. 1-8.

Perception stack 1112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1104-1108, the mapping and localization stack 1114, the HD geospatial database 1122, other components of the AV, and other data sources (e.g., the data center 1150, the client computing device 1170, third-party data sources, etc.). Perception stack 1112 may detect and classify objects and determine their current and predicted locations, speeds, directions, and the like. In addition, the perception stack 1112 may determine the free space around the AV 102 (e.g., to maintain a safe distance from other objects, change lanes, park the AV, etc.). Perception stack 1112 may also identify environmental uncertainties, such as where to look for moving objects, flag areas that may be obscured or blocked from view, and so forth.

Mapping and localization stack 1114 may determine the AV's position and orientation (pose) using different methods from multiple systems (e.g., GPS, IMUs, cameras, LIDAR, RADAR, ultrasonic sensors, the HD geospatial database 1122, etc.). For example, in some embodiments, the AV 102 may compare sensor data captured in real-time by the sensor systems 1104-1108 to data in the HD geospatial database 1122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

Planning stack 1116 may determine how to maneuver or operate the AV 102 safely and efficiently in its environment. For example, the planning stack 1116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), user input, and other relevant data for directing the AV 102 from one point to another. The planning stack 1116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events.

The control stack 1118 may manage the operation of the vehicle propulsion system 1130, the braking system 1132, the steering system 1134, the safety system 1136, and the cabin system 1138. The control stack 1118 may receive sensor signals from the sensor systems 1104-1108 as well as communicate with other stacks or components of the AV compute 120 or a remote system (e.g., the data center 1150) to effectuate operation of the AV 102. For example, the control stack 1118 may implement the final path or actions from the multiple paths or actions provided by the planning stack 1116. Implementation may involve turning the routes and decisions from the planning stack 1116 into commands for the actuators that control the AV's steering, throttle, brake, and drive unit.

The communication stack 1120 may transmit and receive signals between the various stacks and other components of the AV 102 and between the AV 102, the data center 1150, the client computing device 1170, and other remote systems. The communication stack 1120 may enable the AV compute 120 to exchange information remotely over a network. The communication stack 1120 may also facilitate local exchange of information, such as through a wired connection or a local wireless connection.

The HD geospatial database 1122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes. The traffic controls layer may include geospatial information of traffic signal lights, traffic signs, and other road objects and related attributes.

The AV operational database 1124 may store raw AV data generated by the sensor systems 1104-708 and other components of the AV 102 and/or data received by the AV 102 from remote systems (e.g., the data center 1150, the client computing device 1170, etc.). In some embodiments, the raw AV data may include HD LIDAR point cloud data, image or video data, RADAR data, GPS data, and other sensor data that the data center 1150 may use for creating or updating AV geospatial data as discussed further below and elsewhere in the present disclosure.

Data center 1150 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. Data center 1150 may include one or more computing devices remote to the AV compute 120 for managing a fleet of AVs and AV-related services. For example, in addition to managing the AV 102, the data center 1150 may also support a ridesharing (or ridehailing) service, a delivery service, a remote/roadside assistance service, street services (e.g., street mapping, street patrol, street cleaning, street metering, parking reservation, etc.), and the like.

Data center 1150 may send and receive various signals to and from the AV 102 and the client computing device 1170. These signals may include sensor data captured by the sensor systems 1104-1108, roadside assistance requests, software updates, ridesharing (or ridehailing) pick-up and drop-off instructions, and so forth. In this example, the data center 1150 includes one or more of device software management platform 1180, a data management platform 1152, an Artificial Intelligence/Machine Learning (AI/ML) platform 1154, a remote assistance platform 1158, a ridesharing (or ridehailing) platform 1160, and a map management platform 1162, among other systems.

Device software management platform 1180 may include a system to store manifests or configuration files that prescribes or controls the edge devices and the software versions running on the edge devices of AVs in a fleet of AVs (e.g., AV 102). Device software management platform 1180 may include a system to store and maintain software packages for edge devices on various AVs in a fleet of AVs (e.g., AV 102). Device software management platform 1180 may respond to requests or queries from AV compute 120.

Data management platform 1152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing (or ridehailing) service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 1150 may access data stored by the data management platform 1152 to provide their respective services.

The AI/ML platform 1154 may provide the infrastructure for training and evaluating machine learning algorithms for operating the AV 102, the remote assistance platform 1158, the ridesharing (or ridehailing) platform 1160, the map management platform 1162, and other platforms and systems. Using the AI/ML platform 1154, data scientists may prepare data sets from the data management platform 1152; select, design, and train machine learning models; evaluate, refine, and deploy the models; maintain, monitor, and retrain the models; and so on.

The remote assistance platform 1158 may generate and transmit instructions regarding the operation of the AV 102. For example, in response to an output of the AI/ML platform 1154 or other system of the data center 1150, the remote assistance platform 1158 may prepare instructions for one or more stacks or other components of the AV 102.

The ridesharing (or ridehailing) platform 1160 may interact with a customer of a ridesharing (or ridehailing) service via a ridesharing (or ridehailing) application 1172 executing on the client computing device 1170. The client computing device 1170 may be a suitable type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing (or ridehailing) application 1172. The client computing device 1170 may be a customer's mobile computing device or a computing device integrated with the AV 102 (e.g., the AV compute 120). The ridesharing (or ridehailing) platform 1160 may receive requests to be picked up or dropped off from the ridesharing (or ridehailing) application 1172 and dispatch the AV 102 for the trip. Client computing device 1170 may be an example of an edge device 150 as seen in the figures.

Map management platform 1162 may provide a set of tools for the manipulation and management of geographic and spatial (geospatial) and related attribute data. The data management platform 1152 may receive LIDAR point cloud data, image data (e.g., still image, video, etc.), RADAR data, GPS data, and other sensor data (e.g., raw data) from one or more AVs (e.g., AV 102), Unmanned Aerial Vehicles (UAVs), satellites, third-party mapping services, and other sources of geospatially referenced data. In some embodiments, the map viewing services of map management platform 1162 may be modularized and deployed as part of one or more of the platforms and systems of the data center 1150. For example, the AI/ML platform 1154 may incorporate the map viewing services for visualizing the effectiveness of various object detection or object classification models, the remote assistance platform 1158 may incorporate the map viewing services for replaying traffic incidents to facilitate and coordinate aid, the ridesharing (or ridehailing) platform 1160 may incorporate the map viewing services into the client application 1172 to enable passengers to view the AV 102 in transit enroute to a pick-up or drop-off location, and so on.

Exemplary Processor-Based System

Figure 12:
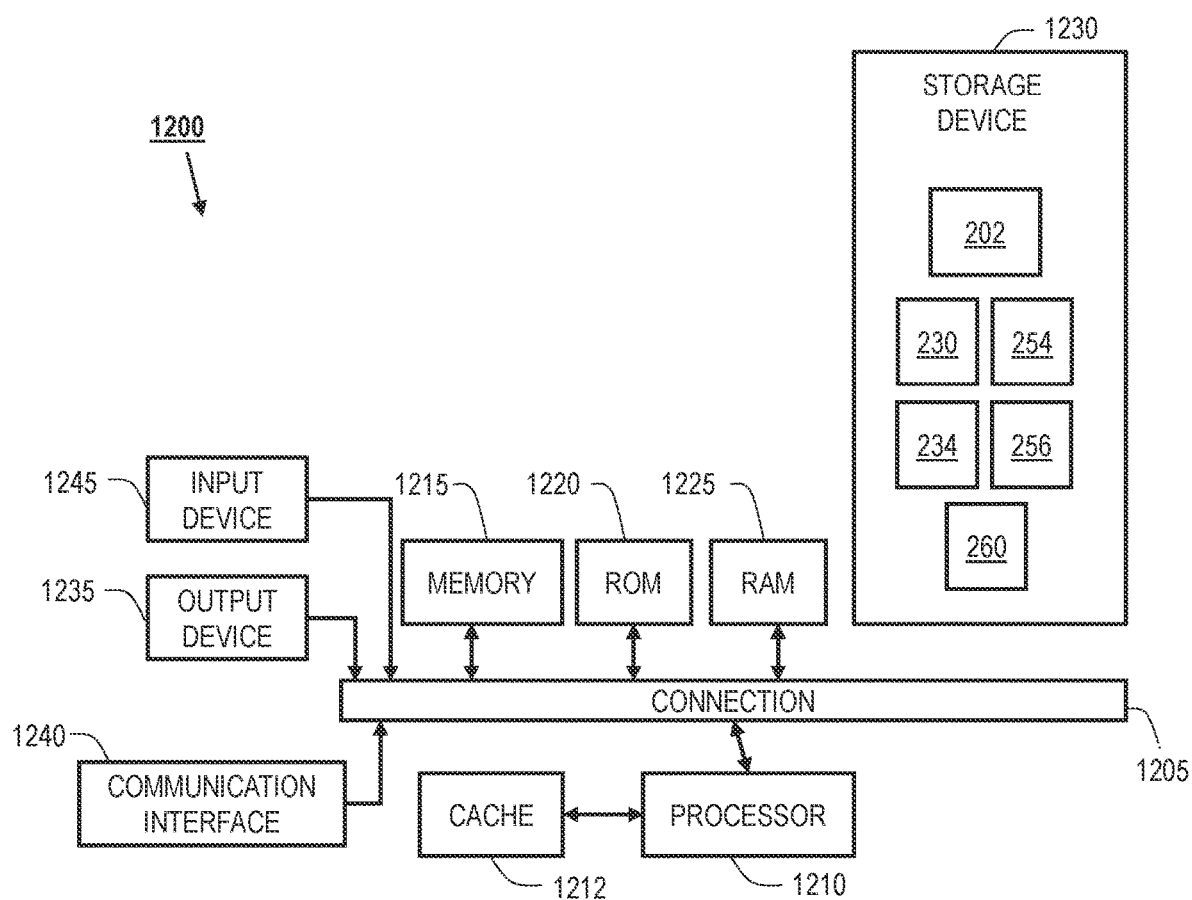
FIG. 12 illustrates an exemplary processor-based system with which some aspects of the subject technology may be implemented.

FIG. 12 illustrates an example processor-based system with which some aspects of the subject technology may be implemented. For example, processor-based system 1200 may be any computing device making up, or any component thereof in which the components of the system are in communication with each other using connection 1205. Connection 1205 may be a physical connection via a bus, or a direct connection into processor 1210, such as in a chipset architecture. Connection 1205 may also be a virtual connection, networked connection, or logical connection. Connection 1205 may be an example of inter-process communication.

In some embodiments, computing system 1200 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1200 includes at least one processing unit (Central Processing Unit (CPU), Graphical Processing Unit (GPU), Machine Learning processor, microprocessor, or other suitable processor) 1210 and connection 1205 that couples various system components including system memory 1215, such as Read-Only Memory (ROM) 1220 and Random-Access Memory (RAM) 1225 to processor 1210. Computing system 1200 may include a cache of high-speed memory 1212 connected directly with, in close proximity to, or integrated as part of processor 1210.

Processor 1210 may include any general-purpose processor and a hardware service or software service, implementing functionalities encoded as instructions stored on storage device 1230 as illustrated in the figures. Processor 1210 may essentially be a completely self-contained computing system, containing multiple cores or processors, a bus, memory controller, cache, etc.

A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc.

Computing system 1200 may also include output device 1235, which may be one or more of a number of output mechanisms known to those of skill in the art. In some instances, multimodal systems may enable a user to provide multiple types of input/output to communicate with computing system 1200. Computing system 1200 may include communications interface 1240, which may generally govern and manage the user input and system output. The communication interface may perform or facilitate receipt and/or transmission of wired or wireless communications via wired and/or wireless transceivers.

Communication interface 1240 may also include one or more GNSS receivers or transceivers that are used to determine a location of the computing system 1200 based on receipt of one or more signals from one or more satellites associated with one or more GNSS systems.

GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 may be a non-volatile and/or non-transitory and/or computer-readable memory device and may be a hard disk or other types of computer-readable media which may store data that is accessible by a computer.

Storage device 1230 may include software services, servers, services, radios (e.g., transceivers), etc., that when the code that defines such software is executed by the processor 1210, it causes the system 1200 to perform a function. In some embodiments, a hardware service that performs a particular function may include the software component stored in a computer-readable medium in connection with the necessary hardware components, such as processor 1210, connection 1205, output device 1235, etc., to carry out the function.

Storage device 1230 may include instructions encoded thereon to implement components such as launcher 202, gateway web server 230, gateway backchannel mailbox manager 234, customer-facing access point backchannel mailbox manager 260, relay endpoint 254, and customer-facing access point web server 256, etc. The components and the functionalities being performed are illustrated in FIGS. 1-10.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or networked environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 is a method for managing edge devices of a vehicle, comprising: receiving, by a web server implemented on an automotive network gateway from a launcher implemented on a compute system of the vehicle, an expected version string at a first uniform resource identifier corresponding to version checking; transmitting, by the web server, a version checking request having the expected version string in a User Datagram Protocol (UDP) packet over a one-way Ethernet network connection to a relay endpoint implemented on an access point; receiving, by a backchannel mailbox manager implemented on the automotive network gateway over a backchannel, a first enumerated type data value in response to the version checking request; transmitting, by the backchannel mailbox manager, the first enumerated type data value to the web server via inter-process communication; and decoding, by the web server, the first enumerated type data value to determine a first message response to the version checking request corresponding to the first enumerated type data value.

In Example 2, the method of Example 1 can optionally include: querying, by the launcher, a configuration file to determine the expected version string.

In Example 3, the method of Example 1 or 2 can optionally include receiving, by the launcher, the expected version string from a device software management platform remote from the vehicle.

In Example 4, the method of any one of Examples 1-3 can optionally include the first enumerated type data value corresponding to a message response indicating that the expected version string matches a current version string.

In Example 5, the method of any one of Examples 1-3 can optionally include the first enumerated type data value corresponding to a message response indicating that the expected version string does not match a current version string.

In Example 6, the method of any one of Examples 1-4 can optionally include the backchannel being a limited communication channel for transmitting enumerated type data values.

In Example 7, the method of any one of Examples 1-6 can optionally include decoding the first enumerated type data value comprising: looking up the first enumerated type data value in a data structure that maps different enumerated type data values to different message responses.

In Example 8, the method of any one of Examples 1-7 can optionally include transmitting, by the web server, the first message response to the launcher using the first uniform resource identifier corresponding to version checking.

In Example 9, the method of any one of Examples 1-8 can optionally include receiving, by the web server from the launcher, a transfer request of a software package at a second uniform resource identifier corresponding to transfer of software packages; transforming, by the web server, the software package into UDP packets; and transmitting, by the web server, the UDP packets of the software package over the one-way Ethernet network connection to the relay endpoint.

In Example 10, the method of Example 9 can optionally include: transmitting, by the webserver, a file transfer preparation packet to the relay endpoint prior to transmitting the UDP packets of the software package, wherein the file transfer preparation packet includes metadata about the software package.

In Example 11, the method of Example 9 or 10 can optionally include receiving, by the backchannel mailbox manager over the backchannel, a second enumerated type data value in response to the UDP packets having the software package; transmitting, by the backchannel mailbox manager, the second enumerated type data value to the web server via inter-process communication; and decoding, by the web server, the second enumerated type data value to determine a second message response to the transfer request corresponding to the second enumerated type data value.

In Example 12, the method of Example 11 can optionally include transmitting, by web server, the second message response to the launcher using the second uniform resource identifier corresponding to transfer of software packages.

In Example 13, the method of Example 11 or 12 can optionally include the second enumerated type data value corresponding to a message response indicating that the software package was received successfully at the relay endpoint.

In Example 14, the method of any one of Examples 1-13 can optionally include receiving, by the web server from the launcher, an installation request of a software package at a third uniform resource identifier corresponding to software installation requests; and transmitting, by the web server, a UDP packet having an instruction to install the software package over the one-way Ethernet network connection to the relay endpoint.

In Example 15, the method of Example 14 can optionally include: receiving, by the backchannel mailbox manager over the backchannel, a third enumerated type data value in response to the UDP packet having the instruction to install the software package; transmitting, by the backchannel mailbox manager, the third enumerated type data value response to the web server via inter-process communication; and decoding, by the web server, the third enumerated type data value to determine a third message response to the installation request corresponding to the third enumerated type data value.

In Example 16, the method of Example 15 can optionally include transmitting, by web server, the third message response to the launcher using the third uniform resource identifier corresponding to installation of software installation requests.

In Example 17, the method of Example 15 or 16 can optionally include the third enumerated type data value corresponding to a message response indicating that the instruction to install the software package was received successfully at the relay endpoint.

In Example 18, the method of Example 15 or 16 can optionally include the third enumerated type data value corresponding to a message response indicating that the software package was successfully installed.

In Example 19, the method of Example 15 or 16 can optionally include the third enumerated type data value corresponding to a message response indicating that an installation of the software package encountered an error.

In Example 20, the method of any one of Examples 1-19 can optionally include: setting, by the web server, a first timer in response to transmitting the version checking request to the relay endpoint; and in response to not receiving a response from the backchannel mailbox manager before the first timer expires, transmitting, by the web server, a failure message response to the launcher using the first uniform resource identifier corresponding to version checking.

In Example 21, the method of any one of Examples 9-20 can optionally include: setting, by the web server, a second timer in response to transmitting the UDP packets of the software package to the relay endpoint; and in response to not receiving a response from the backchannel mailbox manager before the second timer expires, transmitting, by the web server, a failure message response to the launcher using the second uniform resource identifier corresponding to transfer of software packages.

In Example 22, the method of any one of Examples 11-21 can optionally include: setting, by the web server, a second timer in response to transmitting the UDP packets of the software package to the relay endpoint; and in response to receiving the second enumerated type data value from the backchannel mailbox manager after the second timer expires, logging, by the web server, that the second enumerated type data value was late.

In Example 23, the method of any one of Examples 14-22 can optionally include: setting, by the web server, a third timer in response to transmitting the UDP packet having the instruction to install the software package to the relay endpoint; and in response to not receiving a response from the backchannel mailbox manager before the third timer expires, transmitting, by the web server, a failure message response to the launcher using the third uniform resource identifier corresponding to software installation requests.

Example 24 is a method for managing edge devices of a vehicle, comprising: receiving, from a web server implemented on an automotive network gateway over a one-way Ethernet network connection at a relay endpoint implemented on an access point, a version checking request having an expected version string in a User Datagram Protocol (UDP) packet; querying, by the relay endpoint, a web server implemented on the access point for a current version string; comparing, by the relay endpoint, the expected version string and the current version string; encoding, by the relay endpoint, a result of the comparing as a first enumerated type data value; and transmitting, by a backchannel mailbox manager implemented on the access point over a backchannel to a web server implemented on the automotive network gateway, a response to the version checking request, wherein the response has the first enumerated type data value.

In Example 25, the method of Example 24 can optionally include: transmitting the first enumerated type data value via an inter-process communication from the relay endpoint to the backchannel mailbox manager.

In Example 26, the method of Example 24 or 25 can optionally include the first enumerated type data value corresponding to a result where the expected version string matches a current version string.

In Example 27, the method of Example 24 or 25 can optionally include the first enumerated type data value corresponding to a result where the expected version string does not match a current version string.

In Example 28, the method of any one of Examples 24-27 can optionally include the backchannel being a limited communication channel for transmitting enumerated type data values.

In Example 29, the method of any one of Examples 24-28 can optionally include encoding the result of the comparing as the first enumerated type data value comprising: looking up the result in a data structure that maps different enumerated type data values to different comparison results.

In Example 30, the method of any one of Examples 24-29 can optionally include receiving, from the web server implemented on the automotive network gateway over the one-way Ethernet network connection at the relay endpoint, UDP packets corresponding to a software package; reconstructing, by the relay endpoint, a file of the software package from the UDP packets; and transferring, by the relay endpoint to the web server implemented on the web server implemented on the access point, the file.

In Example 31, the method of Example 30 can optionally include: receiving, from the web server implemented on the automotive network gateway over the one-way Ethernet network connection at the relay endpoint, a file transfer preparation packet having metadata about the software package.

In Example 32, the method of Example 30 or 31 can optionally include receiving, by the relay endpoint from the web server, a response indicating that the file transfer was successful; encoding, by the relay endpoint, the response indicating that the file transfer was successful as a second enumerated type data value; relaying, by the relay endpoint to the backchannel mailbox manager implemented on the access point, the second enumerated type data value indicating that the file transfer was successful; and transmitting, by the backchannel mailbox manager implemented on the access point over the backchannel to the backchannel mailbox manager implemented on the automotive network gateway, a response to the UDP packets corresponding to the software package, the response having the second enumerated type data value.

In Example 33, the method of any one of Examples 24-32 can optionally include receiving, from the web server implemented on an automotive network gateway over the one-way Ethernet network connection at the relay endpoint, a UDP packet having an instruction to install a software package; and transmitting, by the relay endpoint to the web server implemented on the web server implemented on the access point, a request to install the software package.

In Example 34, the method of Example 33 can optionally include receiving, by the relay endpoint from the web server, a response indicating a result of the request to install the software package; encoding, by the relay endpoint, the response indicating the result as a third enumerated type data value; and relaying, by the relay endpoint to the backchannel mailbox manager implemented on the access point, the third enumerated type data value indicating the result; and transmitting, by the backchannel mailbox manager implemented on the access point over the backchannel to the backchannel mailbox manager implemented on the automotive network gateway, a response to the UDP packet having the instruction to install the software package, the response having the third enumerated type data value.

In Example 35, the method of any one of Examples 24-34 can optionally include transmitting, by the relay endpoint, a request to the web server implemented on the access point; setting, by the relay endpoint, a timer in response to transmitting the request; receiving, by the relay endpoint from the web server implemented on the access point, a late response to the request after the timer expires; and invalidating, by the relay endpoint, the late response.

Example 36 can optionally include a vehicle, comprising: one or more edge devices; a compute system having a launcher to manage the one or more edge devices at launch time of the vehicle; an automotive network gateway having a first backchannel mailbox manager to receive enumerated type data values, and a first web server to decode enumerated type data values into responses for the launcher; an access point having a relay endpoint, a second web server in communication with the one or more edge devices and the relay endpoint to encode messages as enumerated type data values, and a second backchannel mailbox manager to transmit messages having the enumerated type data values; a one-way Ethernet network connection between the automotive network gateway and the access point to transport User Datagram Protocol (UDP) data traffic from the first web server to the relay endpoint; and a backchannel between the automotive network gateway and the access point to transfer enumerated type data values from the second backchannel mailbox manager to the first backchannel mailbox manager.

In Example 37, the vehicle of Example 36 can optionally include the one or more edge devices comprising a computing device usable by a passenger of the vehicle.

In Example 38, the vehicle of Example 36 or 37 can optionally include the compute system further including a checker to perform one or more of the following: validate software version of software running on one of the one or more edge devices; validate hardware version of one of the one or more edge devices; trigger a software package targeted to one of the one or more edge devices to be sent to the access point; and trigger an installation of a software package on one of the edge devices.

In Example 39, the vehicle of any one of Examples 36-38 can optionally include the compute system further comprising a software stack implemented on one or more processors for perceiving an environment of the vehicle, prediction of objects in the environment, planning of the vehicle, and controlling the vehicle.

In Example 40, the vehicle of any one of Examples 36-39 can optionally include that data traffic cannot be sent from the access point to automotive network gateway via the one-way Ethernet network connection.

In Example 41, the vehicle of any one of Examples 36-40 can optionally include the backchannel being a daisy-chained audio bus communication channel.

In Example 42, the vehicle of any one of Examples 36-40 can optionally include the backchannel being a non-feature rich, limited backchannel.

Example 43 includes one or more non-transitory computer-readable media storing instructions that, when executed by one or more processors, cause the one or more processors to perform any one of the computer-implemented methods of Examples 1-35.

Example 44 is an apparatus comprising means to carry out any one of the computer-implemented methods of Examples 1-35.

What is claimed is:

1. A method for managing edge devices of a vehicle, comprising:
   receiving, from a web server implemented on an automotive network gateway over a one-way Ethernet network connection at a relay endpoint implemented on an access point, a version checking request having an expected version string in a User Datagram Protocol (UDP) packet;
   querying, by the relay endpoint, a web server implemented on the access point for a current version string;
   comparing, by the relay endpoint, the expected version string and the current version string;
   encoding, by the relay endpoint, a result of the comparing as a first enumerated type data value;
   transmitting, by a backchannel mailbox manager implemented on the access point over a backchannel to a web server implemented on the automotive network gateway, a response to the version checking request, wherein the response has the first enumerated type data value;

receiving, from the web server implemented on the automotive network gateway over the one-way Ethernet network connection at the relay endpoint, UDP packets corresponding to a software package;

reconstructing, by the relay endpoint, a file of the software package from the UDP packets; and transferring, by the relay endpoint to the web server implemented on the web server implemented on the access point, the file.

2. The method of claim 1, further comprising:

transmitting the first enumerated type data value via an inter-process communication from the relay endpoint to the backchannel mailbox manager.

3. The method of claim 1, wherein the first enumerated type data value corresponds to a result where the expected version string matches a current version string.

4. The method of claim 1, wherein the first enumerated type data value corresponds to a result where the expected version string does not match a current version string.

5. The method of claim 1, wherein encoding the result of the comparing as the first enumerated type data value comprises:

looking up the result in a data structure that maps different enumerated type data values to different comparison results.

6. The method of claim 1, further comprising:

receiving, from the web server implemented on the automotive network gateway over the one-way Ethernet network connection at the relay endpoint, a file transfer preparation packet having metadata about the software package.

7. The method of claim 1, further comprising:

receiving, by the relay endpoint from the web server, a response indicating that the transferring of the file was successful;

encoding, by the relay endpoint, the response indicating that the transferring of the file was successful as a second enumerated type data value;

relaying, by the relay endpoint to the backchannel mailbox manager implemented on the access point, the second enumerated type data value indicating that the transferring of the file was successful; and transmitting, by the backchannel mailbox manager implemented on the access point over the backchannel to the backchannel mailbox manager implemented on the automotive network gateway, a response to the UDP packets corresponding to the software package, the response having the second enumerated type data value.

8. A vehicle, comprising:

one or more edge devices;

a compute system having a launcher to manage the one or more edge devices at launch time of the vehicle;

an automotive network gateway having a first backchannel mailbox manager to receive enumerated type data values, and a first web server to decode enumerated type data values into responses for the launcher;

an access point having a relay endpoint, a second web server in communication with the one or more edge devices and the relay endpoint to encode messages as enumerated type data values, and a second backchannel mailbox manager to transmit messages having the enumerated type data values;

a one-way Ethernet network connection between the automotive network gateway and the access point to transport User Datagram Protocol (UDP) data traffic from the first web server to the relay endpoint; and a backchannel between the automotive network gateway and the access point to transfer enumerated type data values from the second backchannel mailbox manager to the first backchannel mailbox manager, wherein the compute system further comprises a software stack implemented on one or more processors for performing one or more of the following: perceiving an environment of the vehicle, prediction of objects in the environment, planning of the vehicle, and controlling the vehicle.

9. The vehicle of claim 8, wherein the one or more edge devices comprise a computing device usable by a passenger of the vehicle.

10. The vehicle of claim 8, wherein the compute system further includes a checker to perform one or more of the following:

validate software version of software running on one of the one or more edge devices;

validate hardware version of one of the one or more edge devices;

trigger a software package targeted to one of the one or more edge devices to be sent to the access point; and trigger an installation of a software package on one of the edge devices.

\* \* \* \* \*